(12) United States Patent
Horvitz et al.

(10) Patent No.: US 6,232,974 B1
(45) Date of Patent: May 15, 2001

(54) DECISION-THEORETIC REGULATION FOR ALLOCATING COMPUTATIONAL RESOURCES AMONG COMPONENTS OF MULTIMEDIA CONTENT TO IMPROVE FIDELITY

(75) Inventors: Eric Horvitz, Kirkland; Jerome E. Lengyel, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/904,966

(22) Filed: Jul. 30, 1997

(51) Int. Cl.$^7$ ............... G06F 15/16; G06T 15/00; G06K 9/00

(52) U.S. Cl. ............ 345/419; 345/502; 382/167

(58) Field of Search ................ 345/302, 419, 345/433, 420, 502, 428, 473, 522; 358/1.2, 456; 382/229, 167

(56) References Cited

U.S. PATENT DOCUMENTS

| | | | |
|---|---|---|---|
| 5,694,484 | * 12/1997 | Cottrell et al. | 382/229 |
| 5,726,772 | * 3/1998 | Parker et al. | 358/456 |
| 5,867,166 | * 2/1999 | Myhrvold et al. | 345/419 |
| 5,966,133 | * 10/1999 | Hoppe | 345/420 |
| 5,982,373 | * 11/1999 | Inman et al. | 345/419 |
| 6,008,820 | * 12/1999 | Chauvin et al. | 345/502 |
| 6,011,905 | * 1/2000 | Huttenlocher et al. | 358/1.2 |

OTHER PUBLICATIONS

Benjemaa, R. et al., Fast global registration of 3D sampled surfaces using a multi–z–buffer technique, 3–D Digital Imaging and Modeling, pp. 113–120, May 1997.*

Mardia, K.V. et al., Deformable templates in image sequences, Pattern Recognition Conference B, 11th IAPR International Conference, pp. 132–135, Sep. 1992.*

Ronda, J.I. et al., Buffer–constrained coding of video sequences with quasi–constant quality, IEEE International Conference on Image Processing, vol. 3, pp. 367–370, Sep. 1996.*

Funkhouser, et al., "Adaptive Display Algorithm for Interactive Frame Rates During Visualization of Complex Virtual Environments," *Computer Graphics Proceedings of SIGGRAPH 93*, Annual Conference Series, 247–254 (Aug. 1993).

* cited by examiner

*Primary Examiner*—Stephen S. Hong
*Assistant Examiner*—William L. Bashore
(74) *Attorney, Agent, or Firm*—Klarquist Sparkman Campbell Leigh & Whinston LLP

(57) ABSTRACT

A decision-theoretic regulator employs a method for allocating computational resources to components of media content to create the highest quality output for a budget of rendering resources. The components of the content represent parts of the content that have independent quality parameters that the regulator can vary to trade-off quality for computational savings. For example, in multimedia content, the components might be objects in a 3D graphics scene. The method allocates computational resources by attempting to minimize the total expected cost of a rendering task. The method computes the raw error for a rendering action on a component and then maps the raw error to a perceived error based on empirical evidence of how users perceive errors in rendered output. The expected cost is computed from the perceived error or raw error by applying a model of attention that gives the probability that a user is focusing his or her attention on a component. The method minimizes the total expected cost by selecting a rendering action for each component that yields the lowest expected cost for a given rendering budget.

32 Claims, 7 Drawing Sheets

FIG. 6 ATTENTIONAL FOCUS (a1.....an)
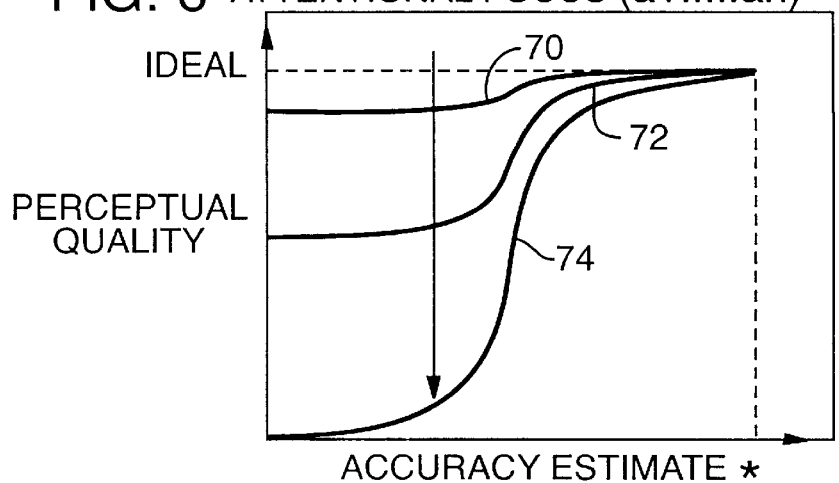
FIG. 7
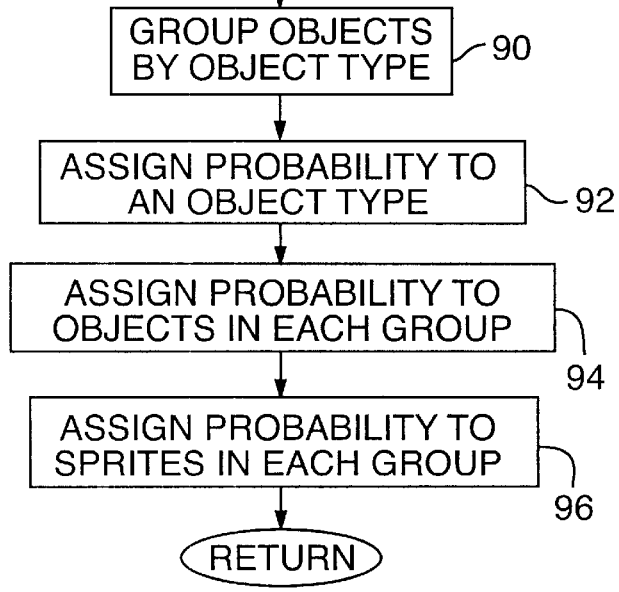
FIG. 8
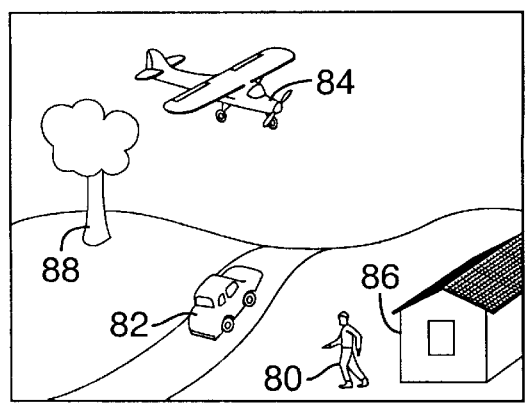

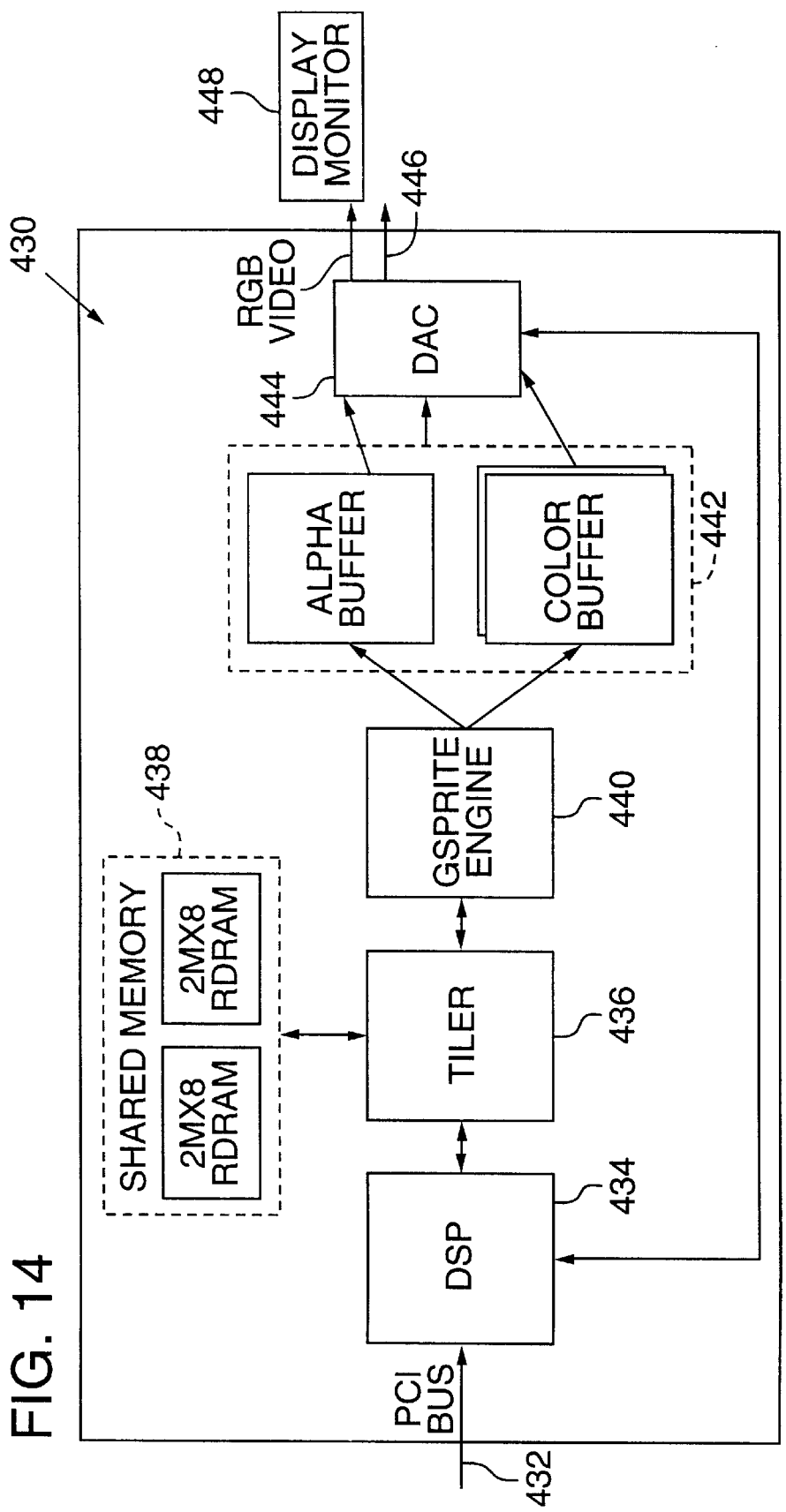

DECISION-THEORETIC REGULATION FOR ALLOCATING COMPUTATIONAL RESOURCES AMONG COMPONENTS OF MULTIMEDIA CONTENT TO IMPROVE FIDELITY

FIELD OF THE INVENTION

The invention relates to a method for improving the quality of multimedia output for computers and special purpose multimedia devices such as graphics accelerators, sound cards, video controllers, etc. More specifically, the invention relates to a method for allocating computational resources of a computer or special purpose rendering device to maximize the perceived quality of multimedia content such as three-dimensional graphics, audio and video.

BACKGROUND OF THE INVENTION

A continuing pursuit in the computer generated graphics and the multimedia industries is to make user interfaces more compelling, realistic and interactive to the user. Today, many application programs for desktop personal computers include a mix of two-dimensional (2D) graphics and audio. With enhancements in video compression techniques, full motion digital video is also becoming a more common feature in some user interfaces. While traditionally limited to expensive graphics workstations and special purpose hardware, real time three-dimensional (3D) graphics applications are now being introduced for the personal computer platforms. Producing realistic, interactive output of any of these media types, and especially, combinations of these media types requires a great deal of computational resources, namely, computational cycles of a microprocessor or rendering device. As such, there is demand for software and hardware tools that manage the use of these resources and improve the quality of the output of media types.

A significant limitation of creating more compelling and realistic graphical content as well as content that includes a mixture of different media types is the computational overhead of creating high quality output. For example, to create a sequence of real time 3D animation, a graphics rendering system has to convert complex 3D models into color intensity values for the hundreds of thousands (or even a million) of pixels that form each image in the animation sequence. To create the effect of realistic motion, a new image must be generated in only fractions of a second.

This demand for computational resources applies not only to rendering graphics, but also applies to rendering other types of multimedia content as well. To create truly realistic content, many media types such as 2D and 3D graphics are typically integrated into the output. In addition, in multi-tasking operating systems common in today's PCs such as the Windows® 95 Operating System from Microsoft, there typically many other application programs vying for limited computational resources. In addition, the amount of resources available and the amount of resources requested by different programs can vary widely during run-time.

The demand for computational resources results not only from generating the output, but also includes the overhead in transmitting the content. For example, it requires a large amount of data (e.g. pixel intensity values) to represent a picture digitally. The same applies for a large audio file or a combination of media types. Data compression techniques are often used to reduce the bandwidth required to transfer media content and the memory required to store it. Unfortunately, these compression techniques further add to the computational overhead of retrieving and generating multimedia content.

In view of the limitations of the computational resources in most media rendering systems, the quality of the output typically has to be sacrificed to produce more complex media content such as real time 3D animation. Conventional 3D graphics rendering systems are typically not flexible enough to allocate rendering resources to features of a graphics scene that are likely to have more impact on the overall quality of the output. As such, artifacts in the output images are likely to be more noticeable to the user.

In the field of 3D graphics, some studies have focused on how to selectively reduce the level of detail of objects in a scene in an attempt to reduce computational costs while optimizing quality of the output. See T. A. Funkhouser and C. H. Sequin, Adaptive Display Algorithm for Interactive Frame Rates During Visualization of Complex Virtual Environments. In *Proceedings of SIGGRAPH* 93, pages 247–254. SIGGRAPH, August 1993.

One drawback of this earlier work is that it fails to allocate computational resources based on the user's focus of attention or based on the perceived quality of the output. Nor does the work employ models of a viewer's attention and consider the relationship between attention and perceived quality. The focus of the user's attention is significant because the user is more likely to perceive an artifact in a feature of the output that he or she is focusing on. Reducing the complexity of a model in a 3D graphics scene will reduce the computational resources needed to render the object. However, reducing the complexity of a model without regard to whether the user is focusing on the object may shift rendering resources away from a part of the scene that is most critical, namely, the part that the user is focusing his or her attention.

The perceived quality is a separate concept from attention and specifically pertains to the user's perception of quality as opposed to some raw measure of quality or some estimate of the accuracy of a rendering approximation. For example, a rough estimate of the quality of a rendering of a scene is the level of geometric detail of the object's in the scene. The relationship between the geometric level of detail and the perceived quality is typically not a direct, linear relationship. In practice, this means that making small changes in the geometric level of detail may not result in a corresponding reduction in the perceived quality, but will reduce the computational overhead of rendering a scene.

To our knowledge, no one has applied the concept of visual search and attention from the field of cognitive psychology to determine how to allocate rendering resources to parts of a graphics scene in the field of computer-generated graphics. In addition, we know of no work in computer generated graphics that has used a measure of perceived quality to control the allocation of rendering resources to parts of a graphics scene.

Other relevant work is described in co-pending patent application Ser. No. 08/671,412 by Nathan P. Myhrvold, James T. Kajiya, Jerome E. Lengyel, and Russell Schick, entitled Method and System for Generating Images Using Gsprites, filed on Jun. 27, 1996, which is hereby incorporated by reference. This patent application discloses a layered rendering architecture where objects are rendered independently to separate image layers called sprites or "gsprites." This rendering architecture can render objects at different spatial resolution and can also render objects at different update rates. Rather than re-render an object for each frame, the rendering system re-uses image layers from previous frames by warping them to approximate the position of objects in the current frame. This patent application describes how rendering resources can be allocated by re-rendering sprites in a priority order based on a raw measure of the accuracy of the image warp. One specific measure of quality called "geometric error" measures how the screen coordinates of selected points of an object in a current frame differ in position from the warped points that result from warping a previously rendered sprite to the current frame. To allocate rendering resources, the rendering system queues objects for rendering in a priority order based on the geometric error of the image warp. The image layers with the largest geometric error have higher priority to the limited rendering resources, and therefore, get re-rendered first before other image layers where the image warp provides a better approximation.

Raw measures of image quality such as the geometric error provide an effective way to dynamically allocate rendering resources to parts of graphics scene. However, this technique does not measure the perceived loss in fidelity. Specifically, the geometric error is often not directly related to the perceived decline in quality. In addition, the geometric error does not take into account the probability that the user is focusing his or her attention on the part of the scene that has been degraded to reduce rendering overhead.

Visual Search and Attention

The paradigm in psychology for measuring the ability of human subjects to identify various features in scenes centers on a visual-search methodology. Studies of visual search have attempted to measure the abilities of human subjects to notice various components of scenes. A large set of studies have uncovered two interrelated classes of visual processing, referred to as preattentive and attentive vision, respectively. Preattentive vision is thought to continually scan large areas at a time in parallel, efficiently noting features representing basic changes in pattern or motion. Attentive visual processes refer to the more serial, resource-limited processes found to be required to recognize details about objects and relationships in scenes.

Neisser noted that features efficiently detected by the preattentive visual processes include the overall color, size, luminance, motion, temporal onset of patterns, and simple aspects of shape like orientation, curvature (but not closure, gaps or terminators). U. Neisser, "Decision time without reaction time: Experiments in visual scanning," *American Journal of Psychology*, 76:376–383, 1980. Julesz defined a class of features efficiently discriminated by preattentive vision, referred to as "textons." B. Julesz, "A theory of preattentive texture discrimination based on first order statistics of textons," *Biological Cybernetics*, 41:131–138, 1975. Textons include elongated shapes such as ellipses, rectangles, and line segments that have specific colors, widths, lengths, orientations, depths, velocities, and flicker. Textons also include the ends of line segments, referred to as terminators, and the crossing of lines. Preattentive processing has been shown to be limited in its ability to detect the absence of features in a target amidst a sea of similar targets that contain the feature (e.g., finding a circle without a slash among circles with a slash). More generally, the parallel, preattentive processes cannot efficiently identify cases where distinct features are conjoined into higher-level patterns or objects; identifying conjunctions of features requires the more focused, resource-strapped attentive vision processes.

Several studies have further elucidated the links between preattentive and attentive processes. For example, researchers have found that objects may be recognized rapidly through efficient interactions of preattentive and attentive processes and search can be made more efficient through training. An example of efficient recognition of objects is the "pop out" effect, where objects seem to jump out of background patterns. Wolfe, et al. performed studies suggesting that serial search for conjunctions can be guided and made more efficient taking advantage of parallel processes. J. M. Wolfe, K. R. Cave, and S. L. Franzel, "Guided search: An alternative to the feature integration model for visual search," *Journal of Experimental Psychology*, 15(3): 419–433, 1989. The group proposed that preattentive processes can filter out distracters from candidates, and, thus, reduce the size of the serial search. This effect appears to depend on the quality of the guidance provided by the parallel processes, and enhanced when elements are distinguished by luminance and color contrast, or when there are discontinuities in spatial or temporal patterning of the first-order properties giving rise to motion or texture differences. P. Cavanaugh, M. Arguin, and A. Triesman, "Effects of surface medium on visual search for orientation and size features," *Journal of Experimental Psychology: Human Perception and Performance*, 16:479–491, 1990. Treisman and Gelade have studied the ability of people to recognize conjunctions of features. The team proposed and found evidence for feature integration theory of attention, where features are detected early on but are only related to one another to form recognizable objects with focused attention. A. M. Triesman and G. Gelade, "A feature-integration theory of attention," *Cognitive Psychology*, 12:97–136, 1980. They also showed that recognition tasks were diminished by distraction and diverting of attention.

Investigation of visual attention has also explored the realm between preattentive and attentive processes by seeking out context-dependent changes in perceptual abilities. Under some conditions, visual resources appear to be distributed evenly over a display, with apparent parallel processing of display items. R. A. Kinchla, "Detecting target elements in multielement arrays: A confusability model," *Perception and Psychophysics*, 15:149–158, 1974. R. M. Shiffrin and G. T. Gardner, "Visual processing capacity and attentional control," *Journal of Experimental Psychology*, 93:72–82, 1972. In other situations, a focused, serial scanning of items in a display occurs. C. W. Eriksen and Y. Yeh, "Allocation of attention in the visual field," *Journal of Experimental Psychology: Human Perception and Performance*, 11:583–597, 1985. W. Prinzmetal and W. P. Banks, "Perceptual capacity limits in visual detection and search," *Bulletin of the Psychonomic Society*, 21:263–266, 1983. One study showed that it is difficult for viewers to split their detailed visual attention to two separate spatial regions. M. Posner, "Orienting of attention," *Quarterly Journal of Experimental Psychology*, 32:3–27, 1980.

Eriksen and Hoffmnan have found the tight focus to have a diameter of approximately 1 degree of visual angle. More generally, response time and accuracy in search tasks have been found to be influenced by the spatial relationships between a target object, the position and number of related objects, and the location on the screen that subjects have been cued to focus on via verbal commands or visual stimuli. R. Colegate, J. E. Hoffman, and C. W. Eriksen, "Selective encoding from multielement visual displays," *Perception and Psychophysics*, 14:217–224, 1973. G. Sperling and M. J. Melchner, "The attention operating characteristic: Examples from visual search," *Science*, 202:315–318, 1978. Reaction times in search tasks have been found to be fastest if attention is focused on the location of the target, M. Posner, "Orienting of attention," *Quarterly Journal of Experimental Psychology,* 32:3–27, 1980, and to increase as the visual angle between a current focus and target increases, as well as with the diminishing distance between a target and distractor objects, C. W. W. Eriksen and J. E. Hoffman, "Temporal and spatial characteristics of selective encoding from visual displays," *Perception and Psychophysics,* 12:201–204, 1972. P. Goolkasian, "Retinal location and its effect on the processing of target and distractor information," *Journal of Experimental Psychology: Human Perception and Performance,* 7:1247–1257, 1981. P. Podgorny and R. Shepard, "Distribution of visual attention over space," *Journal of Experimental Psychology: Human perception and Performance,* 9:380–394, 1983. G. L. Shulman, J. Wilson, and J. B. Sheehy, "Spatial determinants of the distribution of attention," *Perception and Psychophysics,* 37(16):59–65, 1985.

Capacity models for attention have been developed that attempt to describe the spatial characteristics of visual attention. Several different classes of model have been proposed including those where attentional resources are considered as being allocated simultaneously in different amounts to different locations in the visual field, M. L. Shaw, "A capacity allocation model for reaction time," *Journal of Experimental Psychology: Human Perception and Performance,* 4:586–598, 1978, models where resources are toggled between a distributed and a focused, "spotlight" state, J. Jonides, "Further toward a model of the mind's eye's movement," *Bulletin of the Psychonomic Society,* 21:247–250, 1983, and a "zoom-lens" model where there is a tradeoff between the breadth and degree of attention, and where resources are distributed evenly within the purview of the lens, from large views at low accuracies or power, to tighter focuses that are used to serially explore small areas with high-resolution. C. W. W. Eriksen and J. E. Hoffman, "Temporal and spatial characteristics of selective encoding from visual displays," *Perception and Psychophysics,* 12:201–204, 1972. C. W. Eriksen and Y. Yeh, "Allocation of attention in the visual field," *Journal of Experimental Psychology: Human Perception and Performance,* 11:583–597, 1985. C. W. Eriksen and J. D. St. James, "Visual attention within and around the field of focal attention: A zoom lens model," *Perception and Psychophysics,* 40:225–240, 1986. G. W. Humphreys, "On varying the span of visual attention: Evidence for two modes of spatial attention," *Quarterly Journal of Experimental Psychology,* 33A: 17–31, 1981. Several experiments have provided some evidence for the spotlight model, J. Jonides, "Further toward a model of the mind's eye movement," *Bulletin of the Psychonomic Society,* 21:247–250, 1983, and for the zoom-lens model, C. W. W. Eriksen and J. E. Hoffman, "Temporal and spatial characteristics of selective encoding from visual displays, *Perception and Psychophysics,* 12:201–204, 1972. H. Egeth, "Attention and preattention," In G. H. Bower, editor, *The Psychology of Learning and Motivation,* volume 11, pages 277–320, 1977. J. Beck and B. Ambler, "The affects of concentrated and distributed attention on peripheral acuity," *Perception and Psychophysics,* 14:225–230, 1973. Nevertheless, there is still uncertainty about which models best describe visual attention, and to the extent that preattentive and attentive processes are distinct or can be explained by a larger model of attention.

SUMMARY OF THE INVENTION

The invention provides a method for allocating resources to components of a rendering task based on a model of the user's focus of attention and the perceived cost of a rendering action on each component. A primary objective of the method is to optimize the fidelity of the media output by selecting rendering actions for parts of the media content that minimize the total perceived cost of the media output. The parts of the media content are called "components" and can represent graphical media such as an object in a 3D graphics scene.

The model of the user's attention provides a way to measure the probability that the user is focusing on a component. In the case of visual output, the model of attention gives the probability that a visual feature on the display has the user's attention. The user's attention is important because it impacts whether the user perceives changes in a component due to changes in the rendering actions on that component. The method tends to allocate more resources to components that are more likely to hold the user's focus of attention in a frame or series of frames.

The perceived cost is a measure of the perceived degradation in the quality of the output as a function of a rendering action on that component. In the context of graphics rendering, the perceived cost indicates how poor a component of the scene looks to the user as the regulator sacrifices quality to reduce rendering overhead. To dynamically compute the perceived cost of a component, the regulator maps a raw measure of one or more dimensions of error of the component to a perceived quality value. This mapping is based on empirical data from studies of how user's perceive degradations in quality due to changes in rendering actions.

To take into account the user's attention and perceived cost, the method computes an expected perceptual cost for each component. The expected perceptual cost results from applying the model of attention to the perceived cost. The model of attention indicates the extent to which the user will focus on a given component. Thus, it provides a way to measure how much the perceived cost of a component contributes to the total expected cost of producing rendered output.

The method for allocating rendering resources is implemented in a decision-theoretic regulator that allocates rendering resources to achieve the highest quality output for a fixed rendering budget. The regulator attempts to minimize the total expected perceptual cost by selecting rendering actions for each component such that the total computational time fits within a rendering budget. The budget can be fixed, such as a fixed amount of polygon rendering and pixel filling operations per frame, or it can be dynamically varying such that changes from frame to frame or over a sequence of frames. The methods for incorporating the model of the user's attention and the perceived cost have merit individually and do not necessarily need to be combined to implement the regulator. However, a regulator that incorporates both features, and that computes a measure of expected perceptual cost is likely to be more effective in maximizing the perceived quality of the output for a fixed budget of rendering resources.

The invention can be applied to a variety of computational tasks associated with rendering media content. In each of these applications, the regulator is used to optimize fidelity of the media content by allocating computational resources to the components of the content that have the greatest impact on the perceived quality of the output. The regulator can be used in applications where the content to be rendered can be separated into components with independent quality parameters. These independent quality parameters enable the regulator to make rendering choices that trade-off quality to save computational resources. For example, the regulator can be used as a preprocess or to a 3D graphics rendering system to make rendering choices for portions of the object geometry of the graphics scene that allow a trade-off between perceived quality and rendering cost for each portion of the scene. In this context, the rendering task is the process of rendering the 3D graphics scene into an image representing a frame of animation.

One specific application of the invention is in a layered graphics pipeline where components of geometric and shading models can be rendered independently at varying levels of quality. The layered graphics pipeline divides object geometry and shading models for a scene into separate image layers called sprites. The layered architecture can vary the quality parameters for each sprite along "dimensions of degradation" which include temporal resolution, spatial resolution, geometric level of detail, shading model complexity, and the number of objects that get aggregated into a single sprite. Temporal resolution refers to the re-rendering rate of the sprite.

In an implementation for the layered graphics pipeline, the regulator dynamically selects rendering actions for each image layer ("sprite") to minimize the total expected perceptual cost for each frame or set of frames while keeping within a rendering budget (i.e., a target frame rate). The regulator is dynamic in the sense that it can alter quality parameters of individual components of each frame as the frames are generated at a target frame rate.

One approach for minimizing the total perceptual cost for each frame is to perform a search through a set of alternative rendering actions for each sprite to find a rendering action for each sprite that achieves the lowest total cost for a target frame rate.

Another approach is to optimize rendering choices for one dimension of degradation for each sprite, and then refine the rendering actions for each sprite along additional dimensions of degradation. In this approach, the regulator optimizes rendering actions along a first dimension of degradation, namely, temporal resolution, by using a cost-benefit analysis to determine which sprites should be re-rendered rather than approximated with an image warp for each frame. The regulator sorts sprites based on their cost-benefit ratio, defined as the ratio of the marginal expected perceptual cost of a sprite to the incremental savings in computation time of approximating the sprite with a warp rather than re-rendering it. This step yields an optimal ordering of sprites for re-rendering. The rendering system can re-render the sprites in the order of their cost-benefit ratio until the rendering resources are entirely consumed for the current frame.

To consider other dimensions of degradation, the regulator refines the initial ordering of sprites by altering quality parameters of the sprites other than the temporal resolution. For instance, the regulator can adjust the spatial resolution of one or more sprites to increase the number of sprites that can be re-rerendered for the current frame. Computational overhead can be reduced further by aggregating object geometry from different sprites into a single sprite, and by reducing shading model complexity.

The invention provides a number of advantages. It has the potential to allocate rendering resources more effectively because it considers perceived quality as a function of the raw error. In addition, it considers the user's focus of attention so that rendering resources are allocated to parts of media content that the user is likely to be focusing on. The regulator has the additional advantage of dynamically allocating resources for each component of media content for a rendering task that needs to be performed in limited time such as rendering a frame within a target frame rate. The regulator accomplishes this by altering quality parameters for components of the content before each rendering task. In the context of graphics rendering, the specific type and number of quality parameters that can be altered are also unique.

Additional features and advantages of the invention will become more apparent from the following detailed description and accompanying drawings.

BRIEF DESCRIPTION OF THE DRAWINGS

FIG. 6 illustrates several graphs showing how the model of attention impacts the relationship between the accuracy estimate and perceived quality of a rendering action.

FIG. 7 illustrates a flow diagram of a method for assigning probability of attention to features in a graphics scene.

FIG. 8 illustrates a graphics scene to illustrate an example of how objects are classified in the model of attention of FIG. 7.

FIG. 14 is a block diagram illustrating an implementation of a layered graphics rendering system.

DETAILED DESCRIPTION

The invention provides a method for regulating rendering resources based on perceptual quality and the probability that the user's attention is focused on a component of the visual output of a rendering device. This method can be extended to rendering a variety of multimedia content where the content can be divided into components, each having two or more rendering actions. The rendering actions are different ways to render a component that consume varying amounts of computational resources. The method is used as a preprocessing stage to select rendering actions for each component that achieve the highest expected quality for a fixed budget of computational resources. A rendering system then applies the rendering decisions of the regulator to create the media output.

We sometimes refer to the part of a preprocessing stage that implements the method as a decision-theoretic regulator. The decision-theoretic regulator can be implemented, for example, as a pre-processing stage of a real-time 3D graphics rendering system, as a driver for a peripheral device such as a sound card or graphics accelerator, in a 3D authoring tool, in a multimedia application programming interface (API) etc. In each of these applications, decision-theoretic regulator improves the quality of the output by applying limited rendering resources to components of the output that will have the greatest impact on the perceived quality of the output.

The decision-theoretic regulator has two principal components:

1) a module for representing or computing the perceptual cost and the expected perceptual cost of each component (and possibly sub-component) of the media content to be rendered;

2) a module for finding rendering actions for each component that attempts to minimize the total expected perceptual cost given a budget of computational resources.

Figure 1:
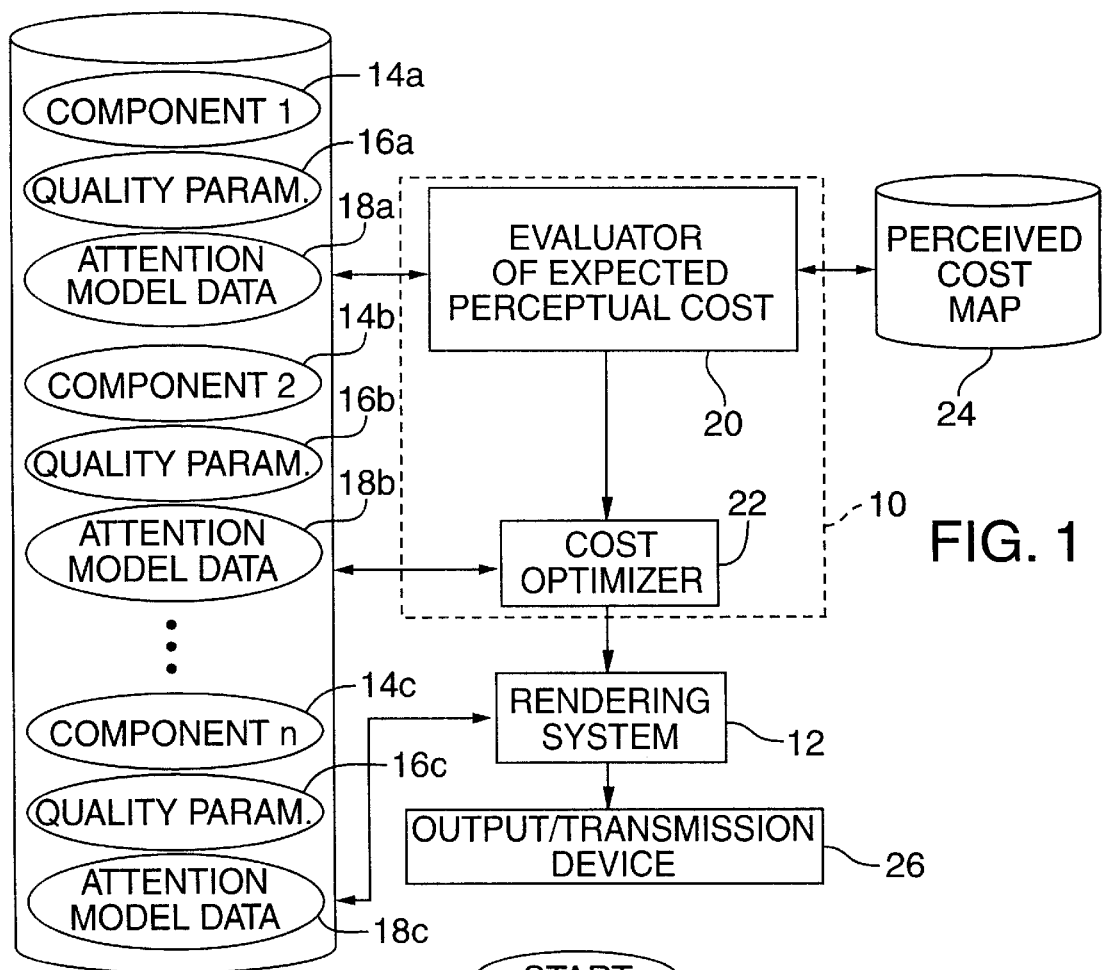
FIG. 1 illustrates a functional block diagram providing an overview of the decision-theoretic regulator.

FIG. 1 is a functional block diagram illustrating an overview of the decision-theoretic regulator. The decision-theoretic regulator 10 is used in a preprocessor of a rendering system 12 to prepare media content for rendering into an output format. The regulator can be applied to a variety of types of media and rendering tasks.

One specific implementation of the regulator prepares object geometry in a 3D graphic scene for rendering in a layered graphics rendering pipeline. The rendering task is to render a frame of animation within a fixed budget of computational resources defined by the number of polygons and pixel fill operations that the rendering pipeline is able to perform at a target frame rate. The components of the media content for each frame are image layers called sprites. The preprocessor in a layered graphics pipeline divides a scene database into components of the object geometry and shading models to be rendered to separate image layers. The regulator evaluates the expected cost of rendering each layer for a selected rendering action, and chooses rendering actions for the layers that minimize total expected cost. The rendering pipeline then proceeds to render each image layer and compose the layers into a frame of animation.

Referring again to the more general case of media content, the regulator computes the expected perceptual cost of a rendering action for each component of the media content in a rendering task. The media content is the input to a rendering task. For example, the media content for the task of rendering a 3D graphics scene includes the object geometry, shading models and attributes needed to render a frame. The rendering task in this context can be defined as the task of rendering a single frame or series of frames.

As depicted in FIG. 1, the media content is divided into components 14a–c. Each of the components have quality parameters 16a–c associated with them. These quality parameters are used to control the quality of the rendered output for the component and can be altered dynamically by the regulator. There is a close relationship between the rendering actions for a component and its quality parameters. The regulator dynamically selects rendering actions for each component to optimize the perceived quality of the output. The components have at least two rendering actions, and these rendering actions are a result of altering the quality parameters for a component as a trade-off between quality and computational overhead. Another term used for the quality parameter is a dimension of degradation, which refers to degrading the quality of a component's rendered output to decrease the computational cost of the component.

Examples of quality parameters for sprites in the layered graphics pipeline include temporal resolution (update rate), spatial resolution, model complexity, and shading complexity. One rendering action is to render the sprite from the 3D scene description to the 2D image at a low spatial resolution. Another rendering action is to render from 3D to 2D with high spatial resolution. Another is to use a 2D image warp to re-use the sprite's image from a previous frame.

Each component is also associated with attention model data 18a–c that the regulator uses to determine the probability that the user is attending to a component at run-time. Later, we describe in more detail how authors of content can specify attention model data that is used at run-time to compute the probability that the user is attending to a component or sub-component in the rendered output of the media content.

The regulator has an evaluator 20 that evaluates the expected perceptual cost of each component and a cost optimizer 22 that selects rendering actions for each component to optimize the total expected perceptual cost. The evaluator 20 begins by getting the raw error of a rendering action on a component. The raw error can be mathematically derived from a quality parameter such as geometric level of detail or actually measured from samples of the rendering output for a component. For example, if the regulator chooses to set the geometric level of detail to certain level, the raw error might be expressed as function of the level of detail and the screen space covered by the graphical object.

The regulator maps the raw error of a rendering action for a component to the perceived cost that this rendering action will have on the quality of the rendered output. A perceived cost map 24 gives a value of the perceived cost based on a given raw error. It represents empirical data recorded from users that indicates how users perceive degradations in quality for different rendering actions that sacrifice quality for computational complexity.

The regulator computes the expected perceptual cost of a rendering component by applying an attention model to the perceived cost of a component. The attention model 26 estimates the probability that the user is focusing on the component using the attention model data associated with the component.

Taking the expected perceptual costs as input, the cost optimizer 22 optimizes the perceived quality of the output by selecting a set of rendering actions for the components of the media content that achieve the highest quality output for a fixed computational budget. The cost optimizer 22 evaluates the computational cost of a component based on the complexity of the component. For example, for 3D graphics models, the computational cost is defined by the number of polygons in a model, and the pixel fill overhead (e.g., the number of color intensity samples (pixels) that the rendering system has to compute for an object model). Typically, the computational cost is assessed relative to the highest quality rendering action. This yields the incremental computational cost of choosing a rendering action that simplifies the rendering task at the expense of reducing the perceived quality.

The output of the cost optimizer 22 is a set of rendering actions to be performed in rendering the media content into an output data format such as a stream of output pixel values (RGB or YUV color intensity values). In the context of 3D graphics, this output is a set of rendering actions used to render the current frame of animation. The rendering system 12 comprises a graphics rendering sub-system. For example, the graphics rendering sub-system could be implemented in a PC with multimedia APIs like DirectDraw and Direct3D from Microsoft Corp, the Windows 95 Operating system from Microsoft, Corp., a software or hardware graphics rendering device, and a video controller.

The rendering system 12 can be inplemented in software in a computer, in a special purpose peripheral such as a video controller, or graphics accelerator, or a combination of both.

The rendering system 12 provides rendered output to an output device 26 such as a display monitor. In 3D graphics applications, the rendering system produces a sequence of frames of animation at a computational frame rate. In other words, the rendering system re-computes an output image or components of it at a rate sufficient to give the effect of smooth continuous motion of graphical objects in a scene. The computational frame rate and refresh rate of the display monitor are not necessarily the same. Whether or not the pixels are updated at the refresh rate, the rendering system supplies a stream of pixels at a rate sufficient to refresh the display on a monitor, called the refresh rate. A conventional video DAC converts digital pixel values into analog intensity values for display on the monitor.

Below, we describe each of these aspects of the decision-theoretic regulator in more detail. Throughout the description of the regulator below, we generalize our description to apply to media content and components of that content. Where appropriate, we give specific examples of the implementation of the regulator for the layered graphics rendering pipeline.

Perceptual Cost

To evaluate the extent to which the user perceives degradations in quality of rendered output, we have developed a perceptual cost function that provides a measure of the perceived cost of each component as a function of the rendering action performed on the component. This function defines the contribution of each component to the overall perceived quality of the output as a function of the raw error. For example, in the layered graphics rendering pipeline, the cost function $C^P(R_k, S_i)$ provides a measure of the cost for each sprite S as a function of the rendering action R performed on the sprite in question. The raw error is a measure of the quality or fidelity of the component in the output as a result of a rendering action that tends to degrade quality to reduce the computational resources required to render the component. Consider the case where the rendering actions for each sprite include re-rendering and warping the sprite. The perceptual cost function determines the contribution of each sprite to the overall perceived quality of the output image as a function of the measure of the raw error between the warped and re-rendered sprite.

The variable, R, for each sprite represents a vector of k decisions about approximations of sprite rendering along different dimensions of degradation. One dimension of degradation is temporal resolution. To degrade a sprite along this dimension, the quality parameter of temporal resolution of the sprite is altered dynamically to allocate resources based on the impact on perceived quality. The rendering actions that relate to this quality parameter are either to re-render or reuse a sprite for a given frame in an animation sequence. The regulator can choose among other rendering actions; or sprites by changing other quality parameters, such as, for example, the spatial resolution of the sprite or the complexity of the shading model used to create the sprite.

In order to compute the perceived cost, the regulator takes the raw error of the rendering action and derives the perceived cost. For each component, there are at least two rendering actions. There is typically a continuum of rendering actions, since some rendering actions have continuous parameters (such as the spatial resolution). Each rendering action represents a tradeoff between computational cost and raw error. The perceived cost, in this context, indicates the extent to which the error of a rendering approximation will be perceived by the user. For example, one way to measure the error of warping a sprite to approximate the motion of 3D objects is by computing the sum of squared distance between a set of characteristic points in the warped and perfectly rendered sprites. The raw error of each sprite can be weighted by computing the product of the portion of the area of the projection surface occupied by the sprite and the measure of the geometric error.

The regulator maps the raw error to a perceived cost by using empirical data or mathematical models of perceptual cost to determine the impact of the data to the user. The empirical data can be compiled from a set of tests to determine how users detect the errors of the approximation. Once compiled, the empirical data can be represented in a mapping function that maps a measured quantity of raw error to a perceived cost. For instance, one way to implement this mapping is through a table lookup.

To determine the overall perceptual cost, the regulator employs a total cost model to combine the perceived cost of each component. For example, one model for combining the costs assigned to multiple sprites into a total perception cost $C^P$ is a sum of all the costs associated with each sprite, $$\Sigma C^P(R_k, S_i) \qquad\qquad 1$$

where $R_k$ is instantiated to the rendering action taken for each sprite.

The combination of the cost of each component need not be linear as shown in the above equation. In the context of the sprite example, the perceived losses and the quality of an image may be a nonlinear function of the degradation of multiple sprites dependent on the relationships among sprites. A number of phenomenon could arise from perceptual dependencies among degradation of multiple sprites including amplification and pop-out effects, and perceptual phenomenon stemming from degradation of sets of sprites perceived to comprise the same object versus sprites scattered among different objects. To account for this phenomenon, the regulator can employ non-linear functions for combining the costs of the degradation of multiple sprites within single objects. While we focus on a linear combination scheme, the following description of the regulator also extends to non-linear total cost functions as well.

Figure 2:
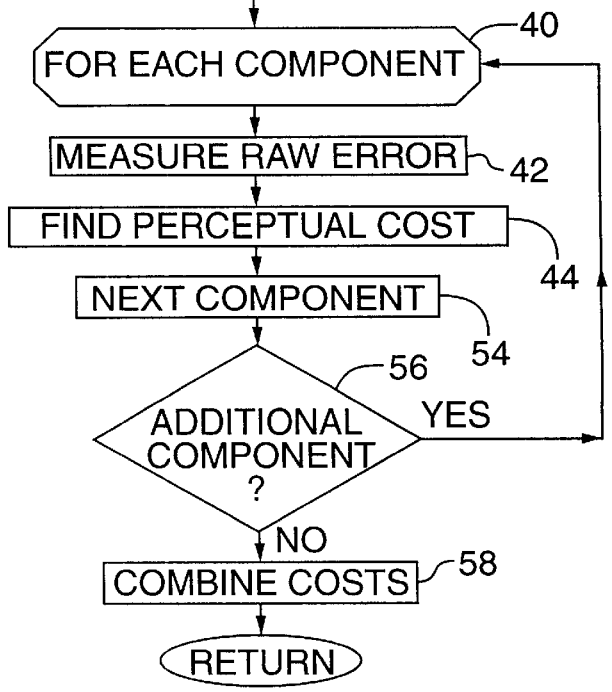
FIG. 2 is a flow diagram summarizing a method for computing the perceived cost of the components of a rendering task.

FIG. 2 is a flow diagram summarizing a method for computing the perceived cost of the components of a rendering task. For each component (40), the regulator measures the raw error (step 42). The raw error is an accuracy estimate of a rendering action on the component. The accuracy of a rendering action can be measured relative to the rendering action that achieves the highest quality for a component. Typically, the highest quality rendering action consumes the most resources. The other rendering actions use approximations or simplify the model of the component to reduce rendering overhead at the expense of quality.

The raw error is sometimes represented as a function of the quality parameters for the component. For example, in the context of the 3D graphics rendering, the raw error can be mathematically related to a quality parameter such as the geometric level of detail of a 3D model, the spatial resolution of an image, or the compression ratio of an image. As the regulator decreases the geometric level of detail, the error increases as a function of the level of detail. At the same time, the computational resources needed to render the object decreases because the number of polygons converted into pixel intensity values decreases. As the regulator decreases the spatial resolution, the error associated with the objects in the scene increases and the objects appear blurred to the user. At the same time, the computational resources of an object decreases because the number of pixel fill operations decreases. As the compression ratio of an image increases, the loss in fidelity increases, yet the overhead of transmitting the image decreases.

The raw error can also be computed by measuring the error of an approximation such as geometric error used to estimate the accuracy of an image warp in a layered graphics rendering pipeline. A variety of other measures of error are outlined in co-pending patent application entitled Method For Measuring The Fidelity Of Warped Image Layer Approximations In A Real Time Graphics Rendering Pipeline by Jerome E. Lengyel, John Snyder, and James T. Kajiya, filed Jul. 30, 1997, U.S. patent application Ser. No. 08/904,245, now issued as U.S. Pat. No. 6,064,393, which is hereby incorporated by reference. These error measurements include error metrics called fiducials that estimate the accuracy of 2D image warps to approximate 3D motion or a color warp to approximate changes in color. Examples of the fiducials include: a sampling fiducial that measures the distortion of a sprite sample when warped from sprite coordinates to screen coordinates by finding the singular values of the 2D image warp (e.g., an affine warp) and determining the distortion based on the magnitude of the singular values, a visibility fiducial that measures transitions in front to back-facing surfaces in an object from one frame to the next, a lighting fiducial that measures the sum of squared difference between warped color values and actual color values of characteristic points, or alternatively, measures the change in position or angle of the light source relative to an object from one frame to the next (if the change in the position or angle of the light source is greater than a threshold, then the object should be re-rendered).

Figure 3:
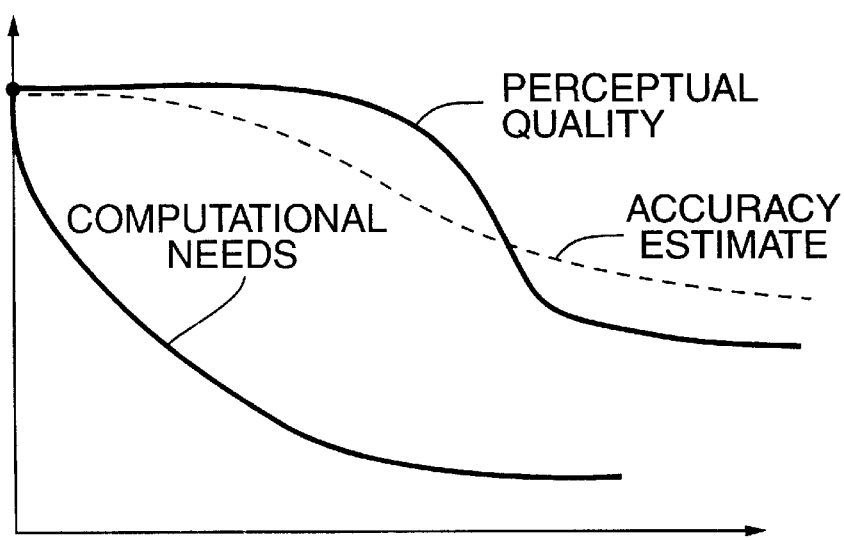
FIG. 3 illustrates a series of graphs showing the relationship between perceptual quality of a component, an accuracy estimate of a rendering action for the component and computational needs of the rendering action.
Figure 4:
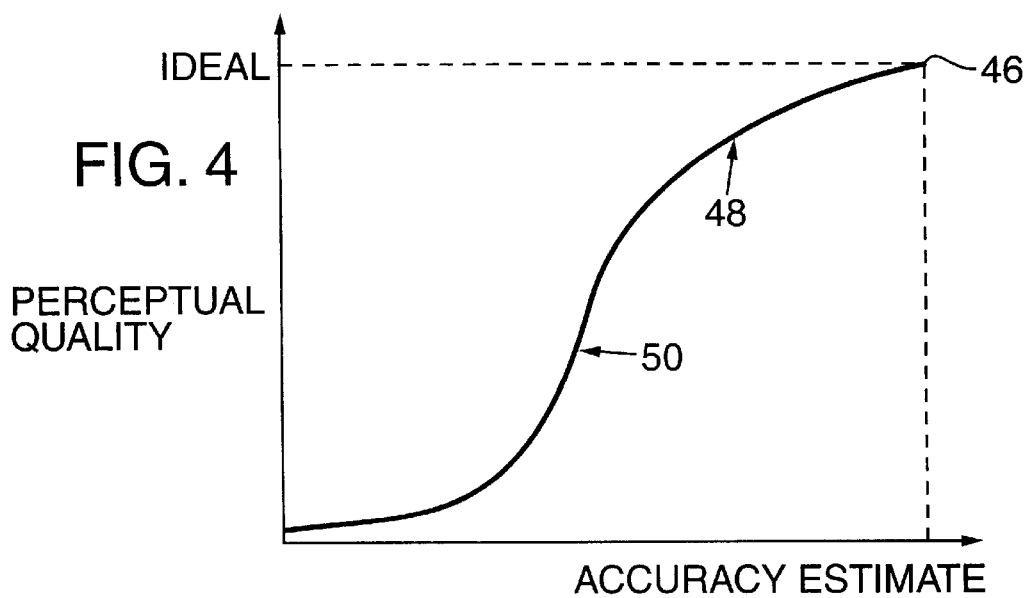
FIG. 4 illustrates an example of the relationship between an accuracy estimate of a rendering action and the perceived quality of the output that the rendering action produces.

The regulator computes the perceptual cost from the raw error (44) based on a predetermined mapping between raw error values and perceptual cost values. The graphs shown in FIGS. 3 and 4 illustrate this concept. For example, FIG. 3 shows how the perceived quality may have a non-linear relationship with the accuracy estimate (the raw error). This shows that while the accuracy declines based on the raw error, the user does not perceive the decline in quality to the extent indicated by the error estimate. The perceived quality function is derived from empirical data taken from recording user's perceptions about the reduction in quality for different rendering options. Note that the perceived quality does not decline as rapidly as the accuracy estimate at first, then declines increasingly rapidly, and finally levels out. This observation shows that the regulator will make better decisions about how to allocate resources if perceived cost is used instead of raw error.

FIG. 4 illustrates this concept further by showing an example of the relationship between the accuracy estimate and the perceived quality. Note that, in the beginning, the perceived quality does not fall-off drastically with a decline in the accuracy estimate starting from the highest quality rendering option (the point 46 marked by the asterisk). The perceived quality tracks closely to the ideal quality initially (see the portion of the curve at reference 48), and later drops drastically at the point 50 where the degradation becomes more noticeable to the user.

FIG. 4 illustrates how the accuracy estimate (an estimate of quality based on raw data measurements) declines faster than the perceived quality, but it can level out above the perceived quality. Thus, the relationship between perceived quality and the error estimate is complex: sometimes the error estimate is pessimistic and sometimes it is optimistic.

The relationship between perceived quality (the perceived cost) and the accuracy estimate can be measured from empirical data. A curve that best fits the empirical data is plotted either by hand or using a curve fitting algorithm. The curve is then represented digitally using a table look up, for example. The table look-up enables the regulator to efficiently map an accuracy estimate to a perceived cost value by looking up the perceived cost based on an accuracy estimate value. At one extreme, the map from estimated accuracy to perceptual cost may simply be a threshold that cuts off at the knee of the curve. This is a binary mapping between acceptable and unacceptable. The more general smooth mapping that models the falloff allows the regulator to better make resource/perceptual cost tradeoffs.

Returning to the flow diagram of FIG. 2, the steps (54, 56) following step 44 show how the measure of perceptual cost for each component is implemented as an iterative process that evaluates one component of the rendering task at a time and repeats the evaluation for each component. A similar iterative process can be repeated for k rendering options for each component of the rendering task.

To evaluate the total perceptual cost of rendering each component, the regulator combines the perceptual costs computed for the selected rendering option for each component as shown in step 58. As noted above, this step of combining the costs can be a simple linear function such as a summation of the costs or a non-linear function where, for example, a selected rendering action for one component has an impact on the perceived cost of one or more other components.

Models of Attention

In the previous section we described how to compute the perceived cost of components in a rendering task. Our research into cognitive psychology, and specifically, visual attention has shown that the user's focus of attention is also important in assessing the cost of a rendering action on a component. For example, degrading the quality of a background sprite in a graphics scene is less likely to have an impact on the quality of the output image if there is a low probability that the user is focusing his or her attention on the graphical objects in the background.

In this section, we describe how to compute an expected cost from the perceived cost of a component using models of attention. Our objective in measuring the expected cost of a component is to approximate the probability, $p(A^s|E)$, the user is selectively focusing on a component of the rendered content given some evidence E about the media content. Specifically, in the case of layered graphics rendering pipeline, our goal is to approximate the probability that a user is focusing on a sprite in a scene. Our models of attention include a scalar model measuring the degree to which a user's vision is allocated to a part of the visual output, and a discrete binary model that indicates whether a user is either selectively attending or not attending to a specific component of the visual output. In the general case, we can extend the perceptual cost $C^P$ to be a function of the rendering action $R_k$ that is applied to multimedia component $S_i$, as well as the amount of attention focused on that component, x, $$C^P(R_k, S_i, x) \quad \text{2a}$$

Several models can be constructed for modeling attention for the decision-theoretic regulator. In a continuous attention model, we assume a scalar model of attention as a random variable that varies between representing a minimal amount of attention at 0 and a maximum attention at 1. With this model, the expected perceptual costs associated with the approximate rendering of multiple components is combined into a total expected perceptual cost by summing together the costs and considering the probability distribution over the degree of attention lent to each component, $$\varepsilon c^P = \sum_i \int_{x=0}^1 p(A^{s_i} = x | E) C^P(R_k, S_i, x) dx \quad \text{2b}$$

We can simplify this model by factoring the attention variable out of the cost function. We assume an attention-independent cost function, which represents the perceptual cost when attention is focused on the component, and consider the cost to be diminished with decreases in attention x, by a function of x and the cost at full attention. For example, we may combine the cost of a rendering approximation associated with full attention and a measure of attention by introducing a multiplicative factor, ranging between 0 and 1. In this case we model the expected perceptual cost as, $$\varepsilon c^P = \sum_i \int_{x=0}^1 p(A^{s_i} = x | E) \alpha(x) C^P(R_k, S_i) dx \quad \text{2c}$$

where $\alpha(x)$ is a factor of attention that modulates the perceived cost between zero and the full cost, depending on the degree of attention. This expression can be simplified to a binary attention model that is based on an approximation assuming that a user is either selectively attending to a component or not attending to the component. Further, this model assumes that the viewer perceives the full cost of degradation when attending and a diminished cost when not attending to a component, $$\varepsilon c^P = \sum_i p(A^{s_i} | E) C^P(R_k, S_i) + [1 - p(A^{s_i} | E)] \alpha C^P(R_k, S_i) \quad 3$$

where $\alpha$ is a constant factor.

To simplify this model further, we can assume that $\alpha$ is zero, implying that multimedia components that are not receiving attention do not contribute to the cost, $$\varepsilon c^P = \sum_i p(A^{s_i} | E) C^P(R_k, S_i) \quad 4$$

Figure 5:
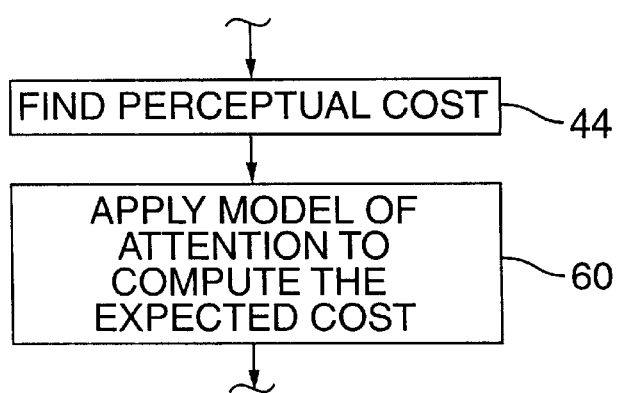
FIG. 5 is a flow diagram illustrating a modification to the method shown in FIG. 2 to compute the expected cost of a component based on a model of the user's attention.

The process of computing the expected cost is just an additional step in computing the incremental cost of each component. FIG. 5 is a simple flow diagram showing how the method in FIG. 2 is modified to perform the additional step of computing the expected cost for the component. After computing the perceived cost, the regulator applies a model of attention to the perceived cost value to compute an expected cost value associated with a component. To compute the total expected cost of a rendering task (the cost for all components in the task), the regulator applies the model of attention to each individual component of the rendering task (60) and then combines the expected cost for each of the components to compute the total expected cost.

FIG. 6 illustrates several graphs, (70, 72, and 74) showing how the model of attention impacts the relationship between the accuracy estimate and perceived quality of a rendering action. Each of the three graphs in FIG. 6 represent a different level of attention. The differences in the graphs reflect that the user is focusing on a particular component at different levels of attention. The first graph 70 represents the case where the user is paying the least amount of attention to the component. In this case, the perceived quality declines very slowly, even as the accuracy decreases significantly. As the user pays more attention to the component, the decline in the accuracy estimate has an incrementally greater impact on the perceived quality as shown in graph 72. Finally, if the users full attention is focused on the component the perceived quality depicted in graph 74 is the same as shown in FIG. 4.

Our model of attention described above applies particularly well to the layered graphics rendering pipeline where each component of the rendering task is a sprite. Each of the above equations for perceived cost and expected cost can be expressed in terms of individual sprites. However, it is also possible to divide a rendering task into other types of components. In the specific case of 3D graphics and the layered graphics rendering pipeline, it is useful to form the model of attention based on the natural tendency of viewers to focus on contiguous objects. A typical action figure or moving object in a 3D animation sequence is comprised of many sprites, especially if the feature or character in the scene is fairly complex, i.e. finally tessellated with polygons. Though complex objects are constructed from several sprites, the user is more likely to focus on continuous objects rather than individual sprites that comprise each object.

To form the model of attention on contiguous objects rather than sprites that the object is composed of, we consider the probability $p(A^{s_{ij}} | A^{O_j}, E)$, of attending to a sprite, conditioned on the viewer selectively attending to interrelated sprites that are perceived as an object $(A^{O_j}, E)$. For example, if we substitute into the simplified binary model of attention represented by Equation 3 the probabilities of attending to objects and the conditional probabilities of attending to sprites given the focus on the specific objects, the expected cost is:

$$\varepsilon c^P = \sum_i \sum_j p(A^{s_{ij}} | A^{O_i}, E) p(A^{O_i} | E) C^P(R_k, S_{ij}) + [1 - p(A^{s_{ij}} | A^{O_i}, E) p(A^{O_j} | E)] \alpha C^P(R_k, S_{ij}) \quad 5$$

where $p(A^{O_j}|E)$ is the probability of a user attending to an object, and $p(A^{s_{ij}}|A^{O_i}, E)$ is the probability that a user will attend to sprites i of object j, given that the viewer attends to that object, and $C(R_k, S_{ij})$ is the perceptual cost of applying the degradation strategy of rendering action $R_k$ to render sprite $S_{ij}$. For the simpler binary model represented by Equation 4, the expected cost is, $$\varepsilon c^P = \sum_i \sum_j p(A^{s_{ij}} | A^{O_j}, E) p(A^{O_j} | E) C^P(R_k, S_{ij}) \qquad 6$$

Authoring and Generating Models of Attention

The framework we have described allows for the use of models of attention ranging from very coarse approximations to more complex Bayesian analyses. One approach is to provide a modeling language that allows authors of graphical or audio content to specify an ordering over the likelihood of the users attention to components in the output images. The regulator can also be adapted to apply rules of inheritance for the conditional priorities of sub-components of each component in the media content. The conditional probabilities of attention can be generated based on such factors as the number of sub-components in a component and the configuration of the sub-components in the component. In the context of 3D graphics rendering, the contiguous objects in each frame can be considered the components, and the sprites representing parts of the objects can be considered the sub-components. The author can then specify an ordering of probability of the viewer attention to objects in a scene as well as rules of inheritance for the conditional priorities of sprites comprising each of the objects.

Requiring an author to specify priority data for each sprite in a scene can be burdensome. One way to simplify the burden is to provide models of attention that take as inputs an author's high level description about the viewer's attention. These models take into consideration the related findings on spatial distribution of attention reviewed in the background section. Rather than require authors to provide inputs about the detailed priorities of multiple sprites for example, the authoring tool can be programmed to seek information from authors about the primary foci of attention in scenes. Such foci are arguments of models of attention that generate the likelihood that other objects in a scene will be noticed by a viewer given these foci and additional evidence about the sprites in the scene.

Evidence E can include features from the scene that captures significant spatial and temporal relationships with objects at the focus of attention such as the class of object, size of object, motion of the object, and optical distance of the object from the viewer. The parameterized models for attention provide probabilities that viewers will attend to various objects in a scene as a function of evidence about the spatial and temporal relationships to the objects tagged of the foci of attention. In our implementation, we take as inputs the objects O* serving as the key foci of attention, $A^{O*}$, and employ functions of features in the scene to approximate the conditional probabilities, $p(A^{O_i}|A^{O*},E)$, of attending to other objects given their spatial and semantic relationships to the key foci O*. These conditional probabilities can be substituted for $p(A^{O_i}|,E)$ in the expected cost models. We can consider additional parameters that allow for the setting or the dynamic adjustment of the size of the spotlight of attention, and for modeling such tradeoffs between size of attentional spotlight and the sensitivity to error. In using such "zoom lens" models, the regulator can size the scope of attention as a function of properties of the objects in an image or set of images. The scope of attention can also be modeled to be a function of the amount of time (the number of frames) in which a relatively stable scene is displayed to a viewer, giving the view more time to scan increasing larger portions of a scene. For example, if a scene has slow moving objects and has a long duration, the user is more likely to attend to more objects in the scene, so a larger spotlight is needed.

Within the framework above, there are a number of approaches for automating the process of assigning likelihood of attention to objects and the sprites in the layered graphics rendering pipeline. One approach for assigning probabilities to components of a graphics scene is illustrated in the flow diagram of FIG. 7. Specifically, FIG. 7 illustrates a flow diagram of a method for assigning probability of attention to features in a graphics scene based on attention model input provided by the author of the graphics scene. In this approach, the model of attention assigns equal likelihoods of attention to objects that fall in the same object type classification. The author who has composed a graphics scene classifies the objects in a segment of related frames by hand as being members of classes, such as the following groups: primary actors, secondary actors, critical environment, and background environment. Consider the examples scene illustrated in FIG. 8. This scene includes a relatively complex set of object geometry representing a person 80. The scene also includes two moving objects, a truck 82 traveling down a road, and an airplane 84 flying across the sky. There are two types of objects in the background, a house 86 with a fair amount of detail located near the person 80, and less important background objects such as the ground and tree 88. The author provides attention model data by classifying objects into the categories listed above. For example, the person 80 could be categorized as a primary actor, the truck 82 and airplane 84 could be classified as secondary actors, the house 86 could be classified as critical environment, and the ground and trees 88 could be classified as background environment.

FIG. 7 illustrates how the regulator uses this attention model data to assign probabilities to sprites of the objects in a graphic scene. In the first step 90, the method groups objects in the current frame by object type, namely primary actors, secondary actors, critical environment, and background environment. Next, it assigns a probability that the user will attend to each object type. Note that both steps 90 and 92 can be performed before runtime because they are independent of the number of objects or sprites within a specific frame.

The next step 94 is to assign probability to the objects in each group which is used in the expected cost equation. The probability of attending to each sprite in each object can be modeled as a function of the probability of attending to the object. For example, the probability of attending to each sprite might be based on a uniform distribution over the m sprites in an object, $p(A^{O_j})/m$. This model captures the result from visual search that the overall complexity of a scene or object will diminish the likelihood that any object will be at the focus of attention.

The model can be extended by evaluating the model attributes to determine whether an object or sprite has special features that will make it more likely to catch the user's attention. The probability that a user will attend to a specific sprite can be a function of such factors as whether the sprite defines an edge of an object, the portion of the surface area of the total object occupied by the sprite, and the degree to which the sprite does not naturally fit into the object. The latter can be captured as a function of the perceptual cost described earlier. Specifically, the model of attention can be expressed, in part, as a function of the perceived cost, $p(A^{S_i}|A^{O_i},E,C^P)$. Here, the perceptual cost $C^P$ provides input to the probability that the user will attend to the sprite in addition to serving as the cost component of the expected cost model.

We can also build models of probability of attention based on the time-varying goals defined by the acute context, current rendered objects, and point systems of computer games. Such models can be keyed to such notions as dynamically changing threats and opportunities as defined in the game.

Beyond hand tagging and the creation of functions that output estimates of probability, we have constructed more formal Bayesian models of attention. In this approach we encode probabilistic information learned from data from viewers observing graphics or sound, or from knowledge acquired from experts about the likelihood of features, given a focus of attention, $p(E|A^{O*})$. At runtime, this method computes $p(A^{O*}|E)$, for all objects, given a set of findings, harnessing Bayes rule. Full Bayesian reasoning is not efficient to perform at runtime. However, the method can be made more efficient by assuming there is only one primary focus of attention, and the features are conditionally independent given this primary focus of attention. Efficient algorithms can be used for computing the likelihood that each object is the focus of attention, using the following simplified form of Bayes rule, $$p(A^{O^*} | E_1, \ldots, E_n) = \frac{p(E_1 | A^{O^*}), \ldots, p(E_n | A^{O^*}) p(A^{O^*})}{p(E_1 | A^{O^*}), \ldots, p(E_n | A^{O^*}) p(A^{O^*}) + p(E_1 | \neg A^{O^*}), \ldots, p(E_n | \neg A^{O^*}) p(\neg A^{O^*})}$$

While a more complete Bayesian method is not practical for real-time rendering systems, it can be used to perform offline tagging of objects in graphics content for later real-time rendering.

Extensions to Computing Perceptual and Expected Cost

Up to this point, we have considered the perceptual cost of a rendering action on a component in terms of a single, discrete rendering task. For example, in applying the regulator to the case of the layered graphics rendering pipeline, we have evaluated the expected perceptual cost in terms of the rendering task of converting a 3D graphics scene into a single frame in an animation sequence. For content that is played in a sequence of discrete units such as frames of an animation sequence, frames of an audio file, or frames of video, our model of perceptual cost can be extended to a set of recent frames. The advantage of considering a set of consecutive frames is that many features in multimedia content have visual and audio persistence across several frames. To account for this persistence, we can modify the cost function $C^P(t-n)$ so that it considers the error in multiple consecutive frames and yields a measure of cost that includes the contribution to perceptual loss based on the persistence of error over a sequence of frames. For example, in the context of sprites and sprite approximations in 3D graphics, this cost function can be used to consider the perceptual loss based on the persistence of error in sprites representing regions considered to be parts of objects.

To follow up on our earlier discussion of the scope of attention, the persistence of an artifact can plays an important role in computing the probability of attention because a user is more likely to notice an artifact that appears to persist over a number of frames. Thus, persistence of an artifact impacts both perceptual cost and the probability that a user will attend to a component in the media content. In the context of sprites in the layered graphics rendering pipeline, we can consider in parallel the influence of the persistence of artifacts on the probabilities that the user will attend to sprites, conditioned on the recent history of error, $$p(A^{Sij}|A^{Oj}, E, C^P(t-n)).$$

To implement this in the regulator, we maintain a list of recent errors associated with that sprite in individual adjacent (or, more generally, recent) frames and combine this list into an overall cost to evaluate the current probabilities and cost.

Regulation

The goal of the decision-theoretic regulator is to select rendering actions for the visual or audio output that results in the highest quality output for a rendering budget. For example, the goal of the regulator in a layered graphics rendering pipeline is to select rendering actions for a set of sprites that results in the highest quality image for a fixed rendering budget. In the general case, such an optimization would require an exhaustive search of all possible combinations of rendering actions coupled with a means for evaluating each candidate. The result of such a search would be valuable, but the method is intractable. Instead of relying on an exhaustive search, we employ greedy approximations and limited search to maximize the value of multimedia under resource constraints. Focusing initially on temporal resolution, the rendering actions for each sprite can be to either to render the sprite or apply an inexpensive two-dimensional transform to approximate the sprites motion. In this case, the regulator decides whether to re-render or reuse a sprite such that the expected perceptual cost of the frame or a set of frames is minimized subject to the constraint that the total time is less than or equal to the time available for generating the frame, at a target frame rate. In short, the decision-theoretic regulator makes a series of tradeoffs for the components or sub-components of a frame to minimize the total expected perceptual cost of the frame.

It is important to note that the regulator dynamically allocates rendering resources. In other words, it changes the allocation of computational resources among the media content as it is being generated or transmitted. To work effectively in this context, the regulator must make rendering decisions efficiently and use few computational resources. For example, in regulating resources to generate frames of animation, the regulator must be able to make rendering decisions and alter quality parameters for components at a small fraction of the frame rate. The regulator re-computes rendering decisions for each frame and must leave enough time to render each frame without compromising the desired frame rate.

Figure 9:
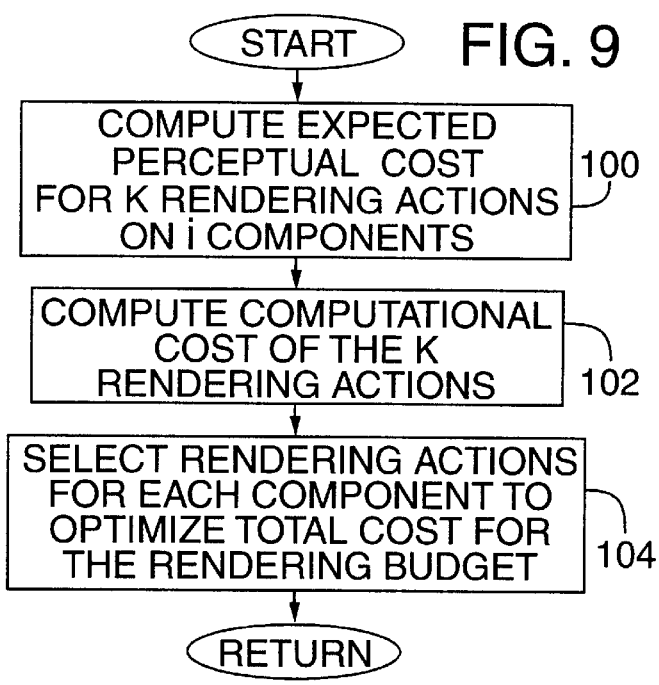
FIG. 9 presents a flow diagram providing an overview of the functions of the decision-theoretic regulator.

FIG. 9 presents a flow diagram illustrating an overview of the functions of the decision-theoretic regulator. First, the regulator computes the expected perceptual costs for a set of k rendering actions on each component I. The number of rendering actions for each component can vary depending on a number of factors, including the type of media content and how the content is subdivided into components and possible sub-components. In the layered graphics rendering pipeline, modifying the temporal resolution yields two rendering actions: re-rendering or warping. Modifying spatial resolution of a sprite yields a possible rendering action for each value of spatial resolution supported in the rendering system. Modifying the level of detail of an object yields a rendering action for each level of detail. Modifying the complexity of the shading model yields a rendering action for each form of the shading model. One rendering action represents the highest quality option, which typically uses the most computational resources. The other actions reduce the quality of the component to spare more rendering resources for other components.

Since the regulator is making choices to trade off quality for computational overhead, it needs to compute how a given rendering action will incrementally increase or decrease the rendering overhead. Thus the next step 102, as illustrated in the flow diagram of FIG. 9, is to compute the computational cost of the rendering actions. One way to assess the computational cost is to compute the relative computational costs or cost savings of the rendering action relative to the highest quality rendering action.

Next, the regulator attempts to find a rendering action for each of the components (or at the components with the most error) such that the total computational cost fits within a budget. If the rendering task is optimized with respect to a single frame, the regulator attempts to select rendering actions that achieve the highest quality output of that frame given a fixed budget of rendering resources to compute each frame.

A variety of known optimization schemes can be applied to minimize the total expected perceptual cost for a given rendering task. However, it is important to point out that in cases where the regulator is dynamically allocating rendering resources, the regulator itself should not consume a significant portion of computational resources that could be better spent in improving the quality of the media output. Thus, an optimization scheme that searches through all possible rendering actions for each component would likely be computationally inefficient. Specifically, in the case of sprites, an optimization algorithm that considers whether to re-render all possible subsets of sprites would likely consume too many resources and defeat the advantage of using warping approximations to reduce rendering overhead.

The Greedy Approach

One way to make the decision-theoretic regulator more efficient is to use a greedy optimization algorithm. While this greedy method applies to other rendering tasks, the specific implementation described below is used to make rendering decisions for sprites in a frame of animation. In this case, the rendering task is to compute a frame of an output image, and the components of the rendering task are the sprites that comprise each frame. Our implementation of the greedy method considers an initial rendering order for the sprites based on one dimension of degradation, namely, varying the temporal resolution of the sprites by choosing to re-render or re-use a sprite. This initial rendering order can be refined by considering additional dimensions of degradation for each sprite.

The regulator computes the order for rendering sprites under a deadline by sorting the cost-benefit ratio for each sprite. The cost is the decrease in the expected perceptual cost of a sprite due to warping rather than re-rendering it. The benefit is the incremental savings in computational cost by warping rather than re-rendering the sprite.

To compute the cost savings of warping a sprite, the regulator determines the marginal computational costs, $\Delta C^c$ ($R_r$, $R_w$, $S_i$) of rendering versus warping a sprite. The marginal computational cost is the difference in computational resources required by these two rendering actions:

$$\Delta C^c(R_r, R_w, S_i) = C_c(R_r, S_i) - C^c(R_w, S_i) \qquad 7$$

where $C^c(R_k, S_i)$ is the computational cost of selecting rendering action $R_k$ for sprite $S_i$. In our implementation, we estimate the marginal computation cost based on time estimates for rendering and warping each sprite. The time estimates are based on the sprite's rendering needs (polygon count, texture count, shading pass count, projected screen area, etc.) which determine the memory bandwidth, processor cycle, and pixel fill requirements.

The perceptual cost contributed to the overall expected perceptual cost of the whole image by reusing each sprite through a two dimensional warp (i.e., rendering action $R_w$) is, $$\Delta C^p(R_r, R_w, S_i) = \int_0^1 p(A^{s_1} = x | E)\alpha(x)C^p(R_w, S_i)dx \qquad 8$$

Re-rendering each sprite reduces the overall perceptual cost by this incremental amount in return for the marginal computation required for rendering the sprite. The ratio of the incremental gain in quality and the computational cost, yields a measure of the expected perceptual refinement rate, $$\phi(S_i) = \frac{\Delta C^p(R_r, R_w, S_i)}{\Delta C^c(R_r, R_w, S_i)}. \qquad 9$$

Figure 11:
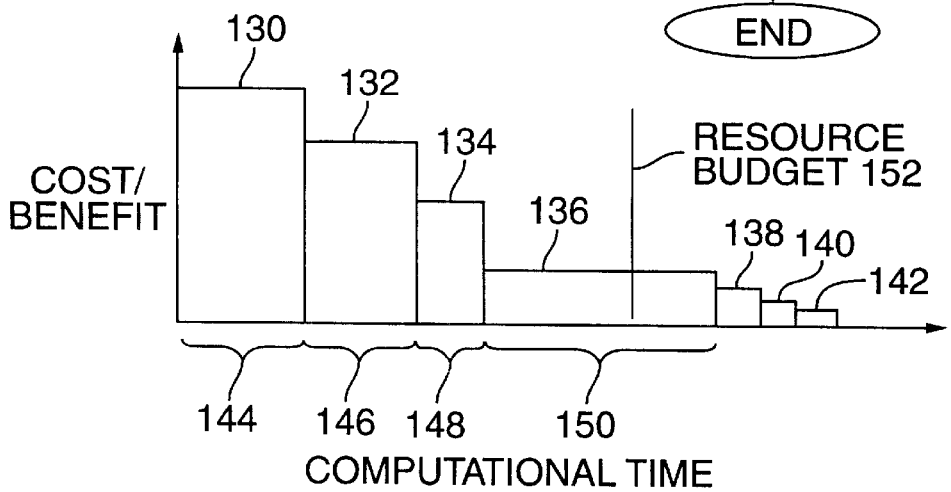
FIG. 11 is a flow diagram of an implementation for regulating rendering resources in a layered graphics rendering pipeline.

We can employ a greedy algorithm to minimize the expected cost of a rendered scene by taking advantage of the expected perceptual refinement rate associated with sprites. We order sprites for re-rendering by this rate until reaching the computational deadline and compare the perceptual cost of this policy with the policy of rendering only the sprite with the highest marginal value. Choosing the policy of these two with the minimal perceptual cost can be shown to have a value within a factor of two of the minimal cost policy. For some additional control cost, we can employ a knapsack problem approximation procedure involving a limited search among subsets of sprites to bring the perceptual cost even closer to the optimal value. The knapsack problem refers to the case where the ordering of sprites does not achieve the minimum perceived cost. The problem can be solved by isolating a series of sprites in the ordered list and searching among this series to find a new ordering that minimize the cost further. An example of this problem is illustrated in FIG. 11 where the rendering order of sprite 136 can be rearranged with sprites 138–140 to lower cost and improve quality further.

This greedy method for allocating rendering resources can be used to evaluate more than two rendering options per sprite. Specifically, the greedy method can be used to compute an optimal ordering for sprite rendering that serves as a scoring function for a greedy search through other dimensions of degradation. The other dimensions of degradation have corresponding rendering actions that trade-off image quality for reduced computation time. In the context of sprites, alternate dimensions of degradation include, for example, diminishing the spatial sampling of a sprite, and the shading complexity.

As alluded to above, a search through rendering actions for each sprite is inefficient in the context of the real-time graphics rendering pipeline. However, the greedy method can be used to determine an optimal ordering for a first dimension of degradation, and then refine that initial ordering by evaluating the changes to the total cost due to revising the cost-benefit ratio of each sprite along additional dimensions of degradation.

In one implementation that considers several different dimensions of degradation, the regulator computes an initial, optimal ordering for rendering based on the rendering choices of warping versus re-rendering a sprite. The regulator then refines the optimal ordering of sprites by analyzing alternate dimensions of degradation in a predetermined order of priority, e.g., diminishing the spatial of sampling, then lowering the texture map level of detail, and finally shading complexity by reducing the number of textures, shadow passes, or highlights passes.

For each class of degradation, the regulator computes the decrease in perceived quality in return for the computational resources needed to re-render an additional sprite at the rendering deadline. One way to accomplish this is to examine the best increase in overall image quality that is possible with the rendering of an additional sprite-the sprite that is the first sprite pruned from the rendering list because of the rendering budget. If a change along one dimension of degradation does not reduce the expected cost of the scene, the regulator proceeds to the next dimension. After all dimensions of degradation have been considered, the layered graphics rendering pipeline executes the rendering decisions resulting from the regulator.

Figure 10:
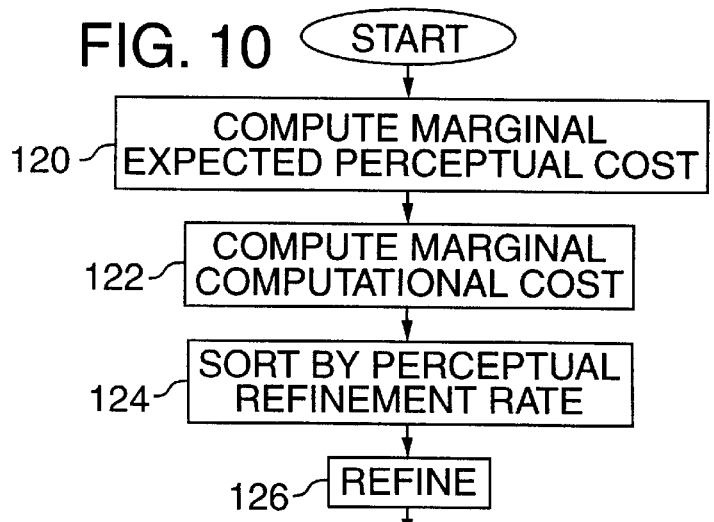
FIG. 10 is a flow diagram illustrating how the greedy method can be used to compute and revise the rendering order for sprites.

FIG. 10 is a flow diagram illustrating how the greedy method can be used to compute and then revise an optimal rendering order for sprites for multiple dimensions of degradation. The method determines an optimal ordering of rendering based on a first rendering action and then evaluates alternative rendering actions in priority order to determine whether to update the ordering of the sprites. To determine initial ordering of sprites, the method begins by computing the marginal expected perceptual cost for each sprite for the first rendering action (step 120). Specifically, in this case, the rendering action is to warp the sprite rather than re-render it for the current frame.

The regulator computes the marginal expected perceptual cost for each sprite by deriving the perceptual cost from the raw error incurred by warping the sprite relative to re-rendering it for the current frame. As described above, one method for measuring the raw error is to measure the geometric error between warped characteristics points and characteristic points from the object model for the current frame. Another method for measuring raw error is to compute the sampling distortion by warping an image sample in the sprite from sprite coordinates to screen coordinates.

These error measurements can be combined together to compute an estimate of the accuracy of approximating the object with a warped sprite. For example, in one implementation, the regulator combines raw error measurements by multiplying the display screen area occupied by the sprite by a linear combination of the geometric and sampling distortion of the sprite.

The regulator then maps the raw error determined from combining the error measurements to a marginal perceived cost using a mapping function as described above. Specifically, empirical data representing the relationship between estimated accuracy and perceived quality is stored in a lookup table that maps the accuracy estimate to a perceived cost value.

The regulator computes the marginal expected perceptual cost from the marginal perceptual cost by applying the model of attention in which objects in the scene are tagged by hand. For each frame, the regulator groups objects by type and then apportions the probability that the user will attend to objects in each group using the probability that the user will attend to each group. In one implementation of the regulator, we assume that each of the n objects in each group has a probability of $p(A^{Oi})$. but update the probabilities to give weight to objects that are visually closer to the viewer as a function of the objects z value.

The modeling language for the objects allows the author to specify changes in the probability of attention as a function of the centrality (in the scene) and the size of the object. The modeling language also allows the author to extend the spotlight of attention to varying degrees of visual angle beyond objects and to consider the probabilities for multiple objects in these regions. This enables the regulator to apply functions that manipulate the scope of attention as described earlier.

The regulator assigns conditional probabilities that each of the sprites in an object are attended to by viewers in a similar way. The modeling language allows the author to specify functions that capture the salience of sprites within objects as functions of their spatial configuration. For example, the author can redistribute the probabilities so as to boost the conditional probability that a viewer will attend to sprites that represent the edges of the objects.

In our analysis of models of attention, we used several different values of alpha in equation 3 above to evaluate the degree to which the degradation of sprites of objects not at the center of attention are noticed by the user. To the extent that sprites are not located at the center of attention for an object, they add less to the overall perceptual cost of the object. As alpha is moved to zero, the regulator assumes that rendering approximations that are not at the center of attention are better tolerated and selectively degrades the sprites composing those images.

The next step 124, as illustrated in FIG. 10, is to compute the marginal computational cost of each sprite. The implementation of the regulator evaluates the marginal computational cost by computing the result of equation 7 for each sprite.

After it computes the marginal expected perceptual cost and computational cost, the regulator computes the ratio as set forth in equation 9 for each sprite. This is a cost-benefit ratio that represents the ratio between the perceptual cost of warping the sprite relative to re-rendering it over the computation savings obtained by warping the sprite relative to re-rendering it. As shown in step 124, the method sorts the sprites by their cost-benefit ratio, which we also refer to as the perceptual refinement rate. The result of this ordering for the first dimension of degradation can be represented graphically as shown in FIG. 11. Each of the bars (130–142) represent a cost-benefit ratio of a sprite. The vertical axis represents the cost-benefit ratio for each sprite and the horizontal axis represents the computational time. The computation time for each sprite is represented by the width of the base of each bar (e.g., 144–150). As shown in FIG. 11, the sprites are ordered in decreasing order of their respective cost-benefit ratios. The resource budget, and specifically in this case, the rendering deadline 152, represents the amount of resources available to render the sprites for the current frame. This budget is based on assumptions about model complexity, sampling resolution, shading model complexity, etc.

The graph in FIG. 11 suggests that if the resource budget were moved further to the right along the computational time axis, an additional sprite could be re-rendered rather than warped. Thus, by making further rendering approximations that save rendering resources, the regulator effectively moves the resource budget limit further along the computational time axis and allows at least an additional sprite to be re-rendered. For example, the resource budget could be moved by reducing the sampling resolution of the sprite 136 such that this sprite will fit within resource budget 152. Alternatively, the regulator could select sprites 138, 140 and 142 for re-rendering because they could be fit within the resource budget. Thus, by modifying additional dimensions of degradation, the regulator can refine the priority order of sprites for re-rendering as reflected in step 126 of FIG. 10.

Alternative Implementation of the Regulator

Though the regulator is more effective if it uses a model of attention and perceived costs, it can also allocate rendering resources dynamically based on raw error caused by varying the quality parameters to save rendering resources. Another version of the regulator uses a similar approach to the one described above in that it prioritizes sprites for re-rendering based on their cost-benefit ratio. However, it does not map the raw error measurements to perceived cost and does not consider a model of attention.

In this version of the regulator, the costs refer to the change in rendering resources consumed as a result of a change in the quality parameter. For example, if the regulator increases the update rate, the cost increases because the rendering system will need to scan convert more geometric primitives (e.g., polygons) per frame on average. If the regulator increases the resolution of an image layer, the cost increases because the rendering system will need to rasterize more pixels per polygon.

The benefits refer to the change in perceptual fidelity reflected in the fiducials. For example, if a warped layer's fiducials turn out to fall within threshold values on the fiducials, the warped layer is a good approximation of a re-rendered layer. As an alternative, the regulator can be programmed to assign a rendering priority to warped layers based on the extent of their distortion, measured by the amount that the fiducials surpass corresponding thresholds.

Figure 12:
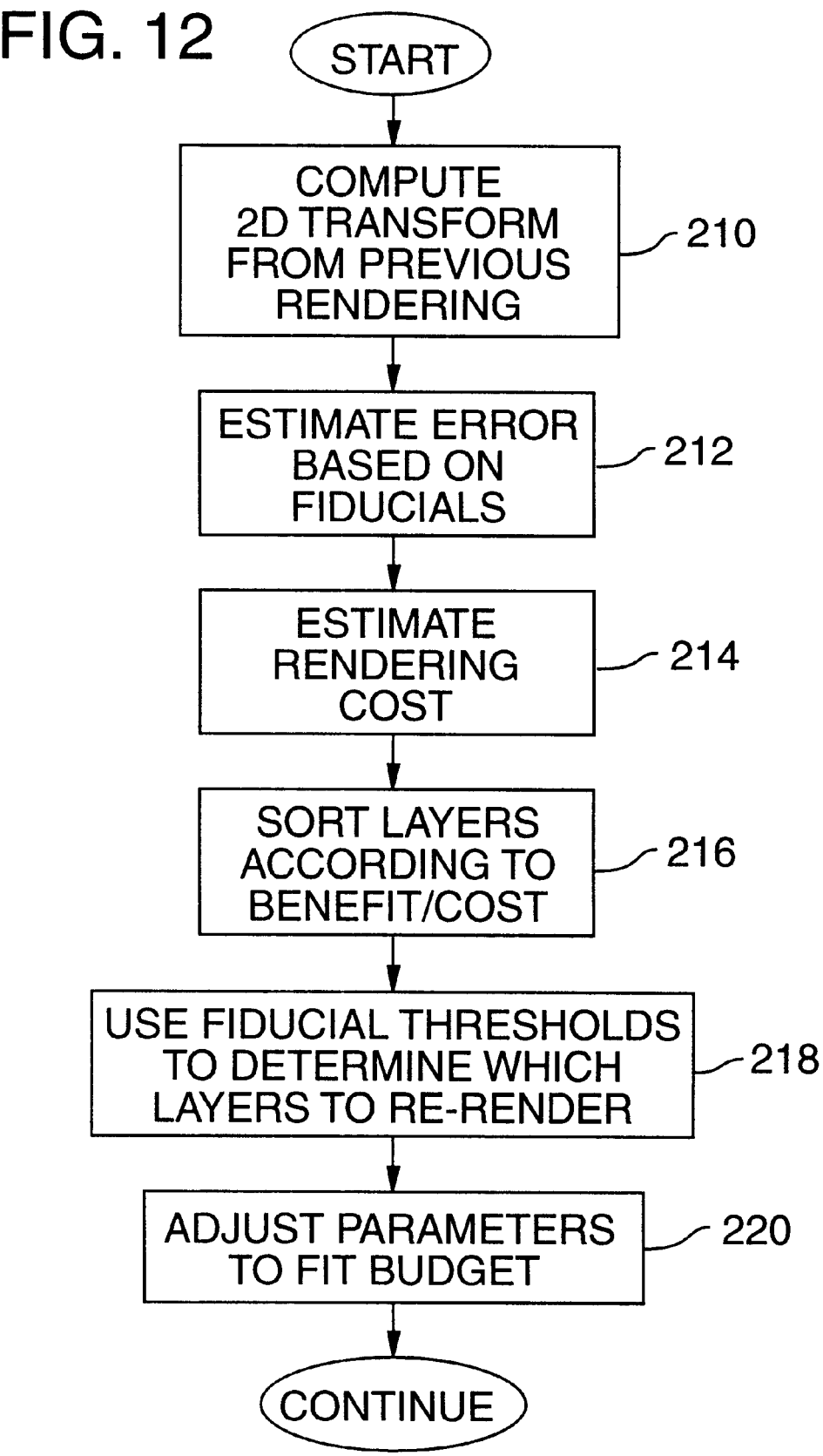
FIG. 12 is a flow diagram illustrating an alternative implementation of a regulator for dynamically allocating rendering resources.

Our implementation of the regulator uses a simple cost-benefit scheduler and fiducial thresholds. The fiducial threshold provides a cutoff below which no attempt to re-render the layer is made (i.e., the image warp approximation is used). FIG. 12 is a flow diagram illustrating how this implementation of the regulator allocates rendering resources for each frame.

The first step 210 is to compute the sprite transforms for each of the independent scene elements in the layered pipeline. For scene elements rendered in a previous frame, the preprocessor computes a warp based on the previous rendering using the characteristic points of the previous and current frame.

In the next step 212, the preprocessor computes fiducials to estimate the distortion of the warped sprite. In this step, the preprocessor can use any combination of the geometric, lighting, sampling, and visibility fiducials referred to above.

Next, the preprocessor estimates the rendering cost of each layer as shown in step 214. This implementation of the regulator bases this cost estimate on a polygon budget, and measures the fraction of this budget consumed by the number of polygons in the object geometry of each layer.

In step 216, the preprocessor sorts layers according to the benefit and cost. Next, it uses the fiducial thresholds to determine which layers to re-render as shown in step 218. The preprocessor selects the layers that do not satisfy thresholds on the fiducials. It then adjusts the quality parameters of the selected layers to fit within a budget as depicted in step 220. Specifically, the regulator adjusts the sprite's spatial resolution to fit within a budgeted total sprite size. This accounts for the rate at which the rendering system can rasterize pixels. This implementation uses a global average depth-complexity estimate to reduce the budget to account for rasterization of hidden geometry. The depth complexity of factored geometry is much less than a frame buffer rendering of the entire scene. Sprites that have been selected for re-rendering in step 218 are allocated part of this total budget in proportion to their desired area divided by the total desired area of the selected set. To dampen fluctuations in the regulation parameters which are perceptible when large, parameter changes are clamped to be no more than ±10% of their previous value at the time of last re-rendering.

At this point, the rendering system renders the selected layers in order, stopping when all resources are used. This version of the regulator can be used as a "budget-filling" regulator or a "threshold" regulator. For a budget-filling regulator, the fiducial threshold is set to be small, on the order of a $\frac{1}{1000}$ of the typical maximum error. All of the rendering resources are used in the attempt to make the scene as good as possible. For a threshold regulator, the threshold is raised to the maximum error that the user is willing to tolerate, This allows rendering resources to be used for other tasks.

Implementation Platform

The decision-theoretic regulator is preferably implemented in software. The specific platform for the regulator can vary, depending on the application. A typical operating environment for this software is a computer such as a personal computer or workstation. In graphics rendering applications, the software that implements the regulator is typically part of a pre-processing stage that prepares graphical models in a scene database for rendering, and a part of a run-time stage where tradeoffs are based on varying content, interaction, and resource load.

Figure 13:
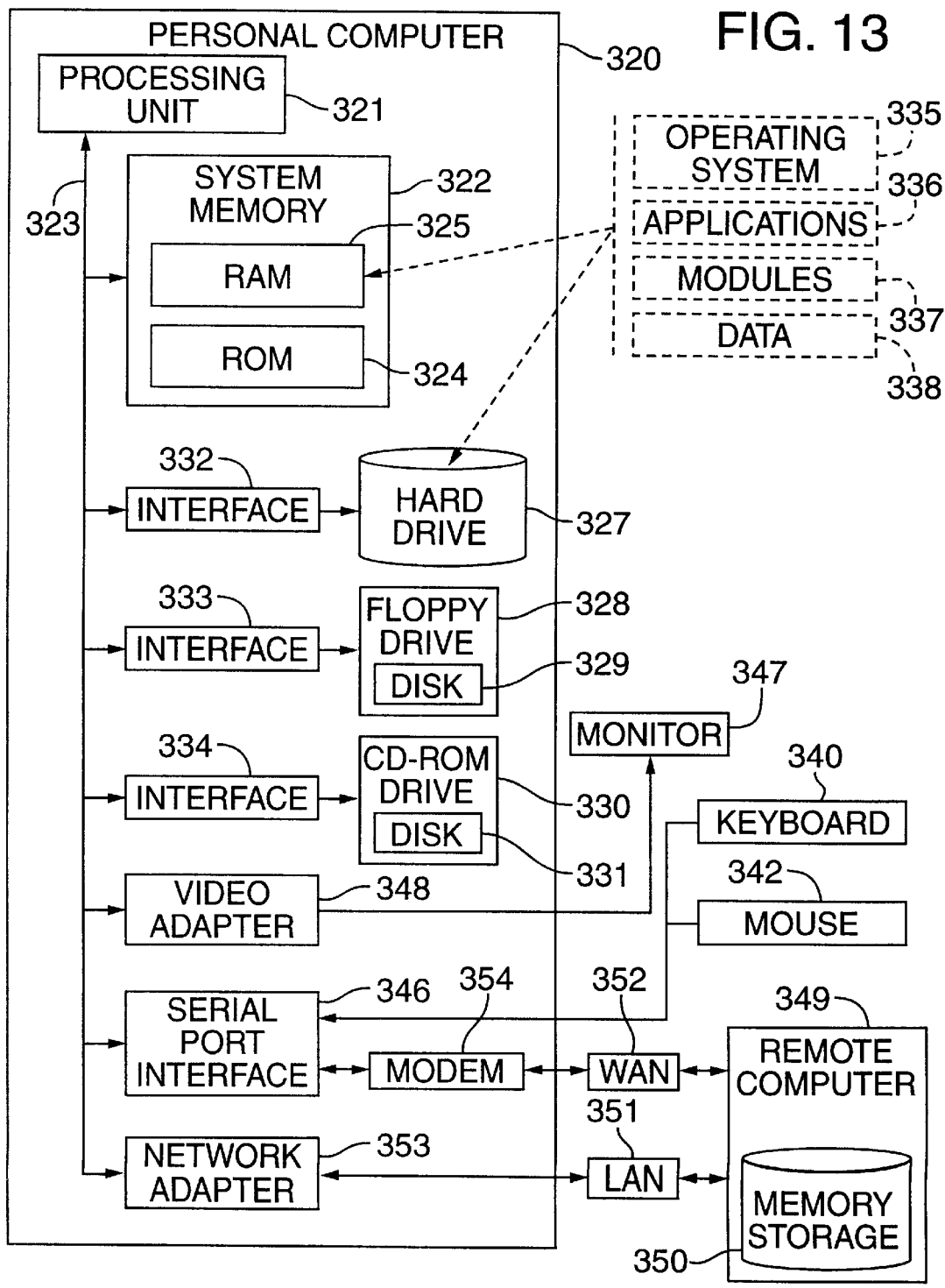
FIG. 13 is a block diagram illustrating an example of a computing environment in which the decision-theoretic regulator can be implemented.

FIG. 13 and the following discussion are intended to provide a brief, general description of a suitable computing environment in which the invention may be implemented. The regulator is preferably implemented in one or more program modules comprising a series of computer-executable instructions. Generally, program modules include routines, programs, components, data structures, etc. that perform particular tasks or implement particular abstract data types. The software that implements the regulator can executed in a variety of computer system configurations, including hand-held devices, multiprocessor systems, microprocessor-based or programmable consumer electronics, minicomputers, mainframe computers, and the like. The regulator may also be executed in distributed computing environments where tasks are performed by remote processing devices that are linked through a communications network. In a distributed computing environment, program modules may be located in both local and remote memory storage devices.

FIG. 13 shows an example of a computer system for implementing the invention. The computer system includes a conventional personal computer 320, including a processing unit 321, a system memory 322, and a system bus 323 that couples various system components including the system memory to the processing unit 321. The system bus may comprise any of several types of bus structures including a memory bus or memory controller, a peripheral bus, and a local bus using any of a variety of conventional bus architectures such as PCI, VESA, Microchannel, ISA and EISA, to name a few. The system memory includes read only memory (ROM) 324 and random access memory (RAM) 325. A basic input/output system 326 (BIOS), containing the basic routines that help to transfer information between elements within the personal computer 320, such as during start-up, is stored in ROM 324. The personal computer 320 further includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of data, data structures, computer-executable instructions, etc. for the personal computer 320. Although the description of computer-readable media above refers to a hard disk, a removable magnetic disk and a CD, other types of media which are readable by a computer, such as magnetic cassettes, flash memory cards, digital video disks, Bernoulli cartridges, and the like, may also be used in this computing environment.

A number of program modules may be stored in the drives and RANM 325, including an operating system 335, one or more application programs 336, other program modules 337, and program data 338. A user may enter commands and information into the personal computer 320 through a keyboard 340 and pointing device, such as a mouse 342. Other input devices (not shown) may include a microphone, joystick, game pad, satellite dish, scanner, or the like. These and other input devices are often connected to the processing unit 321 through a serial port interface 346 that is coupled to the system bus, but may be connected by other interfaces, such as a parallel port, game port or a universal serial bus (USB). A monitor 347 or other type of display device is also connected to the system bus 323 via an interface, such as a video adapter 348. In addition to the monitor, personal computers typically include other peripheral output devices (not shown), such as speakers and printers.

The personal computer 320 may operate in a networked environment using logical connections to one or more remote computers, such as a remote computer 349. The remote computer 349 may be a server, a router, a peer device or other common network node, and typically includes many or all of the elements described relative to the personal computer 320, although only a memory storage device 350 has been illustrated in FIG. 13. The logical connections depicted in FIG. 13 include a local area network (LAN) 351 and a wide area network (WAN) 352. Such networking environments are commonplace in offices, enterprise-wide computer networks, intranets and the Internet.

When used in a LAN networking environment, the personal computer 320 is connected to the local network 351 through a network interface or adapter 353. When used in a WAN networking environment, the personal computer 320 typically includes a modem 354 or other means for establishing communications over the wide area network 352, such as the Internet. The modem 354, which may be internal or external, is connected to the system bus 323 via the serial port interface 346. In a networked environment, program modules depicted relative to the personal computer 320, or portions thereof, may be stored in the remote memory storage device. It will be appreciated that the network connections shown are just examples and other means of establishing a communications link between the computers may be used.

Implementation of the Layered Graphics Rendering Pipeline

As described above, the regulator is particularly useful in a real time, layered graphics rendering pipeline to allocate rendering resources to image layers called sprites. One implementation of a layered graphics rendering pipeline is described in co-pending U.S. patent application Ser. No. 08/671,412. For convenience, we describe the details of the architecture here.

FIG. 14 is a block diagram illustrating an implementation of a layered graphics rendering system 430. This implementation is designed to communicate with a host computer (such as the PC in FIG. 13) through a bus 432. The program modules used to implement the regulator can be executed on the microprocessor in the host PC, in the DSP 434, or in a combination of both. The architecture of the layered graphics system can also be designed such that the microprocessor of the host PC is used in place of the DSP 434.

This particular implementation includes a DSP 434, tiler 436, shared memory 438, gsprite engine 440, compositing buffer 442, and digital-to-analog converter (DAC) 444. The bus 432 transfers commands and data between the host and the DSP 434. In response to rendering commands from the host, the rendering system renders independent scene elements to sprites, combines the sprites into display images, and transfers the display images to a display device through the DAC 444.

The shared memory 438 stores image processing commands and sprites in a specific sprite format called a gsprite (generalized sprite). In this implementation, the shared memory is used to store gsprite and texture data in compressed form, DSP code and data, and various buffers used to transfer data between processing subsystems. The shared memory 416 shown here comprises 4 Mbytes of RAM, and is implemented using two 8-bit Ram bus channels.

The DSP 434 is responsible for performing front end geometry processing, and sprite management. Specifically, the DSP performs front end geometry and lighting calculations used for 3-D graphics. This includes model and viewing transformations, clipping, and lighting. The DSP also performs sprite management including 1) computing sprite transforms, 2) sorting geometry assigned to a sprite among 32×32 sample chunks; 3) tracking sprite motion through their characteristic points; 4) computing warps to approximate changes in position and lighting of previous renderings; 5) computing fiducials; 6) and regulating rendering resources by dynamically adjusting quality parameters of image layers. In sum, the DSP functions as the preprocessor in the layered pipeline. It is important to note that the functions of the preprocessor can also be implemented on the host processor, instead of using both the host processor and DSP.

The architecture of the rendering system shown in FIG. 19 is relatively independent of the specific DSP. However, the DSP should preferably have significant floating point performance. Suitable DSPs include the MSP-1 from Samsung Semiconductor and TriMedia from Phillips Semiconductor. These specific DSPs are two examples of DSPs that provide sufficient floating point performance. The host processor can used in place of the DSP and interface directly with the tiler 436 through the bus 432.

The rendering system 430 shown in FIG. 19 manages image data in three different units: gsprites, chunks, and blocks. The system serially renders image layers in 32×32 sample chunks. To prepare an object for rendering to a sprite, the DSP divides a sprite into chunks and sorts geometry assigned to the sprite among the chunks. The DSP also computes a gsprite display list that lists the gsprites for an output image. This display list includes pointers to gsprites, and more specifically, to gsprite data structures called header blocks. The gsprite header block stores a number of attributes of a gsprite including gsprite width, height, and an affine transform defined in terms of a screen space parallelogram (it may be preferable to use a rectangle to reduce anisotropy of sprite samples). The gsprite header block also includes a list of its member chunks. This list is in the form of pointers to chunk control blocks.

The DSP 434 sets up the gsprite header blocks and stores them in shared memory 416. The gsprite header block includes a header for storing various attributes of the gsprite and for keeping track of where related image data is stored in the shared memory. The data structure includes fields to store the size of the gsprite, to represent the edge equations for the screen edges of the gsprite, to maintain 2-D transform data, and other image attributes.

Chunk control blocks include per chunk and per block parameters. The per chunk parameters include compression parameters, pixel format, and whether the pixel data resides in memory managed in Memory Allocation Units (MAU) in linear memory. An MAU is a piece of shared memory used to allocate chunk memory. MAU managed memory includes a list of MAUs (124 bytes for example), each MAU having a pointer to the next MAU. In one specific implementation for example, the chunk control blocks are stored in sequential MAUs for each gsprite.

The per block parameters include compression type, number of MAUs the block spans, and a block pointer pointing to the first byte of pixel data for the block. The specific block format is an 8×8×4 array of pixels that encode 32 bit pixels (8 bits for RGB and Alpha).

The tiler 436 performs scan-conversion, shading, texturing, hidden-surface removal, anti-aliasing, translucency, shadowing, and blending for multi-pass rendering. Preferably the tiler is implemented as a VLSI chip along with the gsprite engine 440. The tiler rasterizes polygons one chunk at a time in a serial fashion. It has double buffered rasterization buffer so that it can compute sprite samples in one buffer, while resolving fragments for samples in the second buffer. The tiler compresses and stores the resulting rendered gsprite chunks in the shared memory.

The gsprite engine 440 operates at video rates to address and decompress the gsprite chunk data and perform the necessary image processing for general affine transformations (which include scaling, translation with subpixel accuracy, rotation, reflection and shearing). The gsprite engine can be implemented on the same or a different chip from the tiler 436. If on a separate chip, it interfaces with a memory interface unit in the tiler to access the gsprite data structures in shared memory.

The gsprite engine 440 includes a video timing generator which controls video display refresh, and generates the timing signals necessary to control gsprite accesses. To display each frame, the gsprite engine 440 traverses the gsprite display data structures to determine which gsprites need to be read for any given 32-scanline band. For each gsprite in a band, the gsprite engine reads the header block, clips the gsprite to the current display band, and places the gsprite in the gsprite queue for rasterization. The gsprite engine scans each gsprite based on the specified affine transform in the gsprite header and generates read requests. To hide the latency of gsprite accesses, the gsprite engine utilizes a caching scheme that pre-fetches and caches gsprite blocks in a cache memory before a rasterizer computes transformed sprite samples using the cached data.

A simple rasterizer in the gsprite engine scans each gsprite based on the specified affine transform in the gsprite header and calculates the filter parameters for each pixel. The gsprite engine uses a filter to map color and alpha data at sample locations in gsprite space to screen space. Specifically, it applies either a 2×2 or 4 by 4 filter kernel to compute pixel values (color or both color and alpha) at pixel locations in screen space.

The gsprite engine has a compositing buffer control for controlling the operation of a compositing buffer. The compositing buffer control passes transformed sprite samples and instructions on how to combine samples from different layers. The compositing buffer control monitors a ready line from the compositing buffer 442 to ensure that the gsprite engine 440 does not overrun the compositing buffer 442.

Gsprite chunk data is processed a number of scan lines at a time for display. In one implementation, chunk data is processed 32 scan lines at a time. This implementation of the compositing buffer (442) includes two 32 scan line color buffers which are toggled between display and compositing activities. The compositing buffer also includes a 32 scan line alpha buffer which is used to accumulate alpha for each pixel. This particular compositing buffer has compositing logic that implements the standard Over image operator. The compositing logic receives transformed sprite samples, and combines them with the accumulated color values using the alpha values from the alpha buffers.

The DAC 444 includes a R G B video DAC and corresponding video port 446, to video editing devices. Individual components can be used to implement the functionality of the DAC. The DAC 444 implements the basic functions that are common to most RAMDACs on the market today. The DAC includes logic for reading and writing internal control registers, and for pipelining the video control signals. The DAC includes pixel data routing logic that controls the routing of pixel data from the compositing buffers. In the normal operating mode, this data is passed at pixel rates to Color LUTs for each of the three channels. The DAC also has a clock generator that generates the video clock. These clocks are generated by two phase locked clock generators to eliminate synchronization drift.

Conclusion

Though we described specific implementations of the regulator, it is important to emphasize that our method for allocating rendering resources applies to a variety of applications and media types. The regulator can be used to allocate computational resources used to generate graphics, video and audio output. The regulator can also be used to allocate computational resources used to transfer graphics content progressively. In addition, the regulator can be used to allocate computational resources used to compress components of media content.

The regulator allocates computational resources to components using perceived cost derived from raw error measurements. However, the regulator can also effectively allocate rendering resources based on raw error.

The use of an attention model to regulate resources to media content is another feature of the regulator, but is not necessarily required in all implementations. For example, the regulator can allocate rendering resources based on perceived cost, without taking into account the user's focus of attention.

In view of the many possible embodiments to which the principles of our invention may be applied, it should be recognized that the implementations described above are only examples of the invention and should not be taken as a limitation on the scope of the invention. Rather, the scope of the invention is defined by the following claims. We therefore claim as our invention all that comes within the scope and spirit of these claims.

We claim:

1. A method for regulating computational resources needed to present renderable content, where the renderable content is divided into a plurality of components, and a computational rendering budget is designated for rendering the renderable content, the method comprising:

computing perceived cost of a rendering action and assessing computational cost of the rendering action for each of the plurality of components, wherein the perceived cost reflects perceived quality due to performing the rendering action for the component, and the computational cost reflects computing resources required to perform the rendering action for the component;

designating an expected perceptual cost for the rendering actions by applying a model of a user's attention to the perceived cost reflecting perceived quality due to performing the rendering action for the component, wherein the model of attention specifies a probability that a component has a degree of a user's attention;

based on the computational rendering budget, selecting a rendering action from at least two possible rendering actions for each of the plurality of components to minimize total expected perceptual cost of rendered output representing the plurality of components and to fit total computational cost of the selected rendering actions within the computational rendering budget, wherein the total expected perceptual cost is determined by combining the expected perceptual costs for the selected actions, and the total computational cost of the selected rendering actions is determined by combining the computational costs of the selected actions; and transferring the selected rendering actions to a rendering system to render the plurality of the components by performing the selected rendering actions.

2. The method of claim 1 wherein computing the perceived cost comprises:

computing the raw error of a rendering action on the component that degrades fidelity of the component in exchange for saving computational resources; and mapping the raw error to the perceived cost using a mapping function that maps raw error values to perceived cost values based on empirical evidence of how users perceive errors in output images associated with the rendering actions on the components.

3. The method of claim 2 wherein each component is a portion of object geometry of a scene that is rendered into an image layer, and the raw error is a geometric error associated with warping the image layer to approximate motion of object geometry represented in the image layer.

4. The method of claim 1 wherein the renderable content comprises an animation sequence and the perceived cost of a component for a current frame in the animation sequence is a function of the raw error of the component as computed for a plurality of frames in the animation sequence.

5. The method of claim 1 wherein the perceived cost of a component is measured as the raw error of the component caused by degrading spatial resolution or temporal resolution of the component, where the temporal resolution is defined as a rate at which the object geometry of the component is re-rendered, and where the spatial resolution is the spatial resolution of a 2D image rendering of the component.

6. The method of claim 1 wherein each component is a portion of an object geometry of a scene that is rendered into an image layer; and wherein the selecting includes dynamically changing the temporal or spatial resolution of the image layer to trade-off fidelity of the image layer for computational cost of the image layer.

7. The method of claim 1 wherein each component is a portion of an object geometry of a scene that is rendered into an image layer; and wherein the model of attention gives a probability that a user is attending to the portion of the object geometry of the scene that is rendered to the image layer.

8. The method of claim 7 wherein the model of attention classifies objects in a scene into different categories, each with an associated probability that a user is attending to an object of a particular category.

9. The method of claim 7 wherein each component is a portion of the object geometry of the scene that is rendered into an image layer, and wherein selecting a rendering action comprises:

sorting the components in the scene based on a cost-benefit ratio of each component, where the cost-benefit ratio represents the ratio of a marginal expected perceptual cost designated by applying a model of a user's attention and due to an image warp approximation of a component to the computation cost associated with the image warp approximation, where the computational cost associated with the image warp approximation approximates cost savings of the image warp approximation; and scheduling components for re-rendering in the order of the cost benefit ratio such that the image layers with the largest impact on perceived quality are re-rendered within the budget and other image layers are warped to approximate the position of object geometry in a current frame.

10. The method of claim 9 wherein scheduling components includes refining the order of the cost-benefit ratio by adjusting spatial resolution of one or more components to save computational resources so that one or more components can be re-rendered within the budget.

11. The method of claim 1 wherein the model of attention includes performing a Bayesian analysis to determine probability that a user is attending to each of the components in the scene.

12. The method of claim 1 wherein the selecting includes performing an optimization on k rendering actions for each component to find a rendering action for each component such that total perceptual cost is minimized for the budget of computational resources available for a current frame.

13. A computer readable medium on which is stored instructions for performing the method of claim 1.

14. A method for regulating the use of resources for rendering media content based on a computational budget, the method comprising:

dividing the media content into components, where each of the components has at least two possible rendering actions, each with different computational costs, that will convert the component into a format suitable for presentation;

computing a raw error for performing each rendering action for each component for a current frame of the media content;

determining the probability that a user is attending to each of the components of the current frame;

determining the expected cost of rendering a component using each of the rendering actions, where the expected cost is a function of the raw error of the rendering action and the probability that the user is attending to the component representing part of the current frame; and based on the computational budget, regulating use of rendering resources by selecting rendering actions for each of the components such that expected cost is minimized and total computational cost of rendering the frame is within the computational budget.

15. The method of claim 14 wherein the expected cost of each component is a function of a perceived cost and the probability that a user is attending to the component; and further including:

computing the perceived cost for each component by mapping the raw error to a perceived cost based on a perceived cost map that gives a perceived cost value for a raw error value based on empirical data representing the extent to which users perceive the raw error of an associated rendering action.

16. A computer readable medium on which is stored instructions for performing the method of claim 14.

17. A method for regulating the use of resources for rendering media content, the method comprising:

dividing the media content into components, where each of the components has at least two rendering actions, each with different computational costs, that will convert the component into a format suitable for presentation;

computing a raw error of each rendering action for each component for a current frame;

computing the perceived cost for each component by mapping the raw error to a perceived cost based on a perceived cost map that gives a perceived cost value for a raw error value based on empirical data representing the extent to which users perceive the raw error;

combining the perceived costs into a total perceived cost based on the empirical data and reflecting the extent to which users perceive the raw errors; and regulating use of rendering resources by selecting rendering actions for each of the components such that total perceived cost based on the empirical data and reflecting the extent to which users perceive the raw errors is minimized and total computational cost of rendering the frame is within a budget.

18. A computer readable medium on which is stored instructions for performing the method of claim 17.

19. In a pre-processor for a layered graphics rendering pipeline, a method for allocating computational resources to components of a frame of animation in an animation sequence, where each component is a portion of object geometry of a scene that is rendered into an image layer, the method comprising:

computing the raw error of a rendering action on the component that degrades fidelity of the image layer of the component in exchange for saving computational resources;

mapping the raw error to a perceived cost using a mapping function that maps raw error values to perceived cost values based on empirical evidence of how users perceive errors in output images associated with the rendering actions on the components;

determining the expected cost of rendering each component by applying a model of a user's attention to the perceived cost of each component, where the model of attention gives a probability that a user is attending to a component;

evaluating a total expected perceptual cost of an output image incorporating perceived cost values based on empirical evidence of how users perceive errors and the model of a user's attention giving a probability that a user is attending to a component;

based on a rendering budget, selecting a rendering action between at least two rendering actions for each component to minimize the total expected perceptual cost of an output image incorporating perceived cost values based on empirical evidence of how users perceive errors and the model of a user's attention giving a probability that a user is attending to a component, such that total computational cost of the selected rendering actions its within the rendering budget;

transferring the selected rendering actions to a rendering system to render the scene into an output image; and repeating the above to select the rendering actions for subsequent output images in a sequence of animation.

20. A computer-implemented method for regulating computing resources applied to rendering a frame of a multimedia presentation, wherein the frame of the multimedia presentation comprises a plurality of components to be rendered for presentation to a user, wherein a computational budget is provided for rendering the frame of the multimedia presentation, the method comprising:

for the components to be rendered, determining a probability that the component to be rendered has an amount of the user's attention;

for the components to be rendered, designating computational costs for at least two possible actions that will render the component for presentation and calculating a raw error of the possible actions;

for the frame, designating a quality-based rating incorporating a combination of the components' probability that an amount of the user's attention is had by the components and the components' raw errors; and based on the computational budget, selecting actions for each of the components to optimize the frame's quality-based rating incorporating the combination of the components' probability that an amount of the user's attention is had by the components and the components' raw errors, while keeping total computational costs for the components of the frame within the computational budget.

21. The method of claim 20 wherein the at least two actions comprise re-rendering a component and re-using a previous rendering of a component.

22. The method of claim 20 wherein the at least two actions comprise re-rendering a component and warping a previous rendering of a component.

23. The method of claim 20 wherein the probability indicates a likelihood that a component has an entire amount of the user's attention.

24. The method of claim 20 wherein the probability is a random variable representing, an amount of user's attention for a component.

25. A computer-implemented method for regulating computing resources applied to rendering a frame of a multimedia presentation, wherein the frame of the multimedia presentation comprises a plurality of components to be rendered for presentation to a user, wherein a computational budget is provided for rendering the frame of the multimedia presentation, the method comprising:

for the components to be rendered, designating a probability distribution indicating probabilities of a plurality of states for one or more random variables associated with the user's perception of the component;

for the components to be rendered, designating computational costs for at least two possible actions that will render the component for presentation and calculating a raw error of the possible actions;

for the frame, designating a quality-based rating incorporating a combination of the components' raw errors and calculated probability-based expectations of states of the one or more random variables associated with the user's perception of quality of a rendered version of the component; and based on the computational budget, selecting actions for each of the components to optimize the frame's quality-based rating incorporating the combination of the components' raw errors and calculated probability-based expectations of states of the one or more random variable associated with the user's perception of quality of a rendered version of the component, while keeping total computational costs for the components of the frame within the computational budget.

26. A computer-implemented method for regulating computing resources applied to rendering a frame of a multimedia presentation, wherein the frame of the multimedia presentation comprises a plurality of components to be rendered for presentation to a user, wherein a computational budget is provided for rendering the frame of the multimedia presentation, the method comprising:

for the components to be rendered, designating a probability distribution indicating probabilities of a plurality of states for one or more random variables associated with the user's perception of the component;

for the components to be rendered, designating computational costs for at least two possible actions that will render the component for presentation and calculating a raw perceptual error of the possible actions;

for the frame, designating a quality-based expected perceptual cost by considering, for each random variable, a summation of the product of the raw perceptual errors with the probability of each state of the random variable; and based on the computational budget, selecting actions for each of the components to optimize the frame's quality-based expected perceptual cost, while keeping total computational costs for the components of the frame within the computational budget.

27. The method of claim 1 wherein the two possible rendering actions are re-rendering a component and warping a previous rendering of a component.

28. The method of claim 1 wherein the computational budget is variable between successive renderings of the renderable content.

29. The method of claim 1 wherein the model of attention specifies a probability that a component has an entire amount of the user's attention.

30. The method of claim 1 wherein the model of attention specifies a random variable representing an amount of user's attention for a component.

31. The method of claim 30 wherein the probabilities are numerical ratings.

32. The method of claim 17 wherein the frame is an animation frame and the components represent objects displayed in the animation.

* * * * *

UNITED STATES PATENT AND TRADEMARK OFFICE
CERTIFICATE OF CORRECTION

PATENT NO. : 6,232,974 B1
DATED : May 15, 2001
INVENTOR(S) : Horvitz et al.

It is certified that error appears in the above-identified patent and that said Letters Patent is hereby corrected as shown below:

Column 1,
Lines 54 and 55, "there typically" should read -- there are typically --.

Column 2,
Line 41, "object's" should read -- objects --.

Column 15,
Line 48, "at tending" should read -- attending --.

Column 18,
Line 1, "view" should read -- viewer --.
Line 22, "examples" should read -- example --.
Line 67, "$A^{sj}$" should read -- $A^{sij}$ --.

Column 19,
Line 64, "plays" should read -- play --.

Column 20,
Line 39, "can be to either to" should read -- can be to either --.

Column 23,
Line 48, "characteristics" should read -- characteristic --.

Column 24,
Line 7, "$p(A^{Oi})$." should read -- $p(A^{Oi})$, --.

Column 26,
Line 26, "tolerate," should read -- tolerate --.

Column 27,
Line 26, "RANM" should read -- RAM --.

Column 28,
Lines 36, "Ram" should read -- RAM --.
Line 44, "transforms," should read -- transforms; --.

UNITED STATES PATENT AND TRADEMARK OFFICE
CERTIFICATE OF CORRECTION

PATENT NO.   : 6,232,974 B1
DATED        : May 15, 2001
INVENTOR(S)  : Horvitz et al.

It is certified that error appears in the above-identified patent and that said Letters Patent is hereby corrected as shown below:

Column 29,
Line 24, "An MAU" should read -- A MAU --.

Column 30,
Line 7, "2x2 or 4 by 4" should read -- 2x2 or 4x4 --.

Column 32,
Line 34, "cost benefit ratio" should read -- cost-benefit ratio --.

Column 34,
Line 18, "its" should read -- is --.

Column 35,
Line 21, "variable" should read -- variables --.

Signed and Sealed this

Twenty-first Day of May, 2002

Attest:

Attesting Officer

JAMES E. ROGAN
*Director of the United States Patent and Trademark Office*